US006948151B2

(12) United States Patent
Gerken

(10) Patent No.: US 6,948,151 B2
(45) Date of Patent: Sep. 20, 2005

(54) SYSTEM AND METHOD FOR DYNAMIC PACKAGING OF COMPONENT OBJECTS

(75) Inventor: Christopher Henry Gerken, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 09/895,228

(22) Filed: Jun. 29, 2001

(65) Prior Publication Data

US 2003/0005411 A1 Jan. 2, 2003

(51) Int. Cl.[7] ............................ G06F 9/44; G06F 15/16
(52) U.S. Cl. ........................................ 717/108; 709/219
(58) Field of Search ................................ 717/120, 171, 717/172, 177, 108; 707/10, 102, 1; 709/219, 203

(56) References Cited

U.S. PATENT DOCUMENTS 6,675,382 B1 * 1/2004 Foster ........................ 717/177
2003/0020752 A1 * 1/2003 Santiago ..................... 345/764

OTHER PUBLICATIONS

Burke, Eric, A JSP Custom Tag for XML+XSLT, OCI Educational Services, Sep. 2000.*
Scott McReynolds and Greg Douglas, Access Web DataWindows with Java Server Pages Using Custom Tags, Feb. 21, 2001.*

* cited by examiner

*Primary Examiner*—Anil Khatri
*Assistant Examiner*—Trent J Roche
(74) *Attorney, Agent, or Firm*—Van Leeuwen & Van Leeuwen; Joseph T. Van Leeuwen; Mark S. Walker

(57) ABSTRACT

A system and method for dynamically packaging component objects. A server receives a request from a client. The server identifies one or more objects based on the request. The identified objects may be copied from the server's nonvolatile storage area, generated dynamically, or be a result of modifying objects stored on the server's nonvolatile storage area. The identified objects are written to a package file. The server downloads the package file to the client. A dialog may be sent to the client to determine whether the client wishes to download the package file. The package file is provided dynamically in response to the client's request. The package file may include objects that include generated code, such as Java tag handler files, Java tag extra info files, and Java tag library description information. Java definitions may be included with the package file to create a Java jar file.

17 Claims, 17 Drawing Sheets

SYSTEM AND METHOD FOR DYNAMIC PACKAGING OF COMPONENT OBJECTS

BACKGROUND OF THE INVENTION

1. Technical Field

The present invention relates in general to a method and system for dynamically packaging component objects. More particularly, the present invention relates to a system and method packaging objects corresponding to a client request and returning the packaged objects to the client.

2. Description of the Related Art

Computer networks, such as the Internet, typically include client computer (those that request information) and server computers (those that provide information in response to requests). Software called a "browser" provides interactive sessions between clients and servers. Common browser software includes Netscape's Navigator™ software and Microsoft's Internet Explorer™ software.

Originally, servers provided static text, or "web pages" to clients which were displayed in the client's web browsers. Soon after introducing static web pages, however, it became increasingly desirable to provide web pages with dynamic content, for example to display a customer's current account balance. Web servers provided public interfaces so that applications could interface ("plug-in") and collaborate with the web servers to provide the client browsers web pages with dynamic content. As a group, these applications became known as "application servers." Public specifications (the "J2EE Specification") have been provided by Sun Microsystems so that applications built to the specification can be ported from one application server to another.

Application servers include a Java object called a "servlet" which is invoked in response to a request that passes from the client to the server to the application server. The servlet is provided information pertaining to the request as well as an object that encapsulates the response stream back to the client. By using servlet logic developers have control over how a request is processed as well as what information is sent back to the client.

Over time the servlet model proved to be quite powerful. A simple interface existed to a class that could invoke complex logic and reuse any number of system components. One drawback, however, was that developers often coded large portions of static text to accompany a relative small amount of dynamic information. Using servlets, static text is encoded in "write statements" which was more challenging than working with the same static text in a hypertext markup language (HTML) file.

This challenge was addressed with the introduction of Java Server Pages (JSP). JSPs were essentially text macro files that were resolved dynamically into servlets. A JSP source file looks like an HTML file with the addition of embedded Java code. When the page is requested by a client, the JSP source is transformed into a servlet that writes the static text to the response while invoking the Java code to write dynamic content to the response.

Java Server Pages, however, introduced additional challenges to the development environment. While JSP was quite powerful, it increased the skills needed to prepare pages from those of a simple HTML author to those of a Java developer. In development environments, lower amounts of skills were needed to code HTML documents resulting in more employees capable of writing HTML documents. However, Java development required a higher amount of programming skills. Java development skills in development environments is often in short supply and provided by a higher paid Java programmer, while HTML page design skills can be provided by lower paid and less skilled Web page designers.

To address this challenge has been the introduction of "custom tags." Skilled Java programmers can now place the logic that formerly was embedded in Java statements in JSP documents into custom tag files. Web page designers are then able to place the custom tags in Java Server Pages. The custom tags appear much like other HTML or Extended Markup Language (XML) tags which are easier for Web page designers to incorporate into Web pages.

The introduction of custom tags, however, introduced a new set of challenges for application developers. For each custom tag that is to be used in Web pages, there are two classes (a tag handler class and a tag extra information (TEI) class) that are implemented in addition to an XML file that provides parsing information, nesting behavior, and attribute descriptions for the custom tag. The framework for each of these files changes depending on the actions that the custom tags are going to perform. Developers implement the framework in the custom tag files before writing the customized business logic code that will actually perform a particular business function (i.e., look up a customer's account balance).

What is needed, therefore, is a system and method for receiving general tag information from a developer and creating custom tag files that include a framework for implementing the custom tags. The developer should be able to use the resulting files to code particular business logic pertaining to the custom tags.

An additional challenge includes packaging the resulting custom tag files to dynamically provide the developer with the custom tag files. In a client-server environment, the developer would request the custom tag framework files from a server application. Based on the developer's needs, the server would dynamically generate the custom tag files. Traditionally, these files could be placed in a server area that would later be downloaded from the server area using the file transfer protocol (FTP).

What is needed, therefore, is a system and method for dynamically packaging any number of components into a package and providing the resulting package to the client through familiar interface.

SUMMARY

It has been discovered that custom tag files can be created using a tool designed to receive general information about the custom tags and create corresponding tag files, including tag handler classes, tag extended information (TEI) classes, and tag library descriptor (TLD) files. The corresponding tag files are frameworks that are used by Java Server Page (JSP) processing when a custom tag file is encountered. The developer can edit the created files to add particular business logic to perform desired functions. For example, the developer can add the logic used to access the organization's database to retrieve a customer's current account balance. The questions asked to the developer and the types of answers elicited from the developer are designed to be understood by a JSP author with little or no understanding of how custom tag logic is written. In addition, comments can be included with the generated custom tag files to inform the developer of exactly where business logic should be added to further limit the amount of custom tag file understanding needed by the developer.

The developer accesses the software tool, called a Custom Tag Wizard, that creates the custom tag files. The Custom Tag Wizard can be stored and executed from the developer's computer system or the developer can access a Web server that hosts the Custom Tag Wizard. If the Custom Tag Wizard is stored on the developer's computer system then the resulting custom tag files are stored in a disk location on the developer's computer specified by the developer. On the other hand, if a Web server application is used, the Custom Tag Wizard dynamically packages the created custom tag files into a package file, such as a .zip file or a .jar file, and displays a screen to the developer allowing the developer to select a location on the developer's computer system to store the newly created custom tag files.

The packaging component is useful for packaging other components other than custom tag files. Any number of components stored at a Web server can be dynamically packaged and provided to a user. The components included in the dynamically packaged file can either be custom components, such as the custom tag files, or can be static components. For example, a Web site could allow a client to select multiple download files, such as software tools. The Web site could dynamically package all the files selected by a client into a single package and allow the client to download all the selected files in a single download step.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Included at the end of this detailed description are Appendices that include sample output files created by the processing described herein. These sample output files are provided for examples for further understanding when used in conjunction with the description of processes included herein. The inclusion of such examples, however, are intended solely as examples and should not be taken to limit the scope of the invention. Any number of variations may fall within the scope of the processes described herein with the included examples only being one instance of such possible variations.

Figure 1:
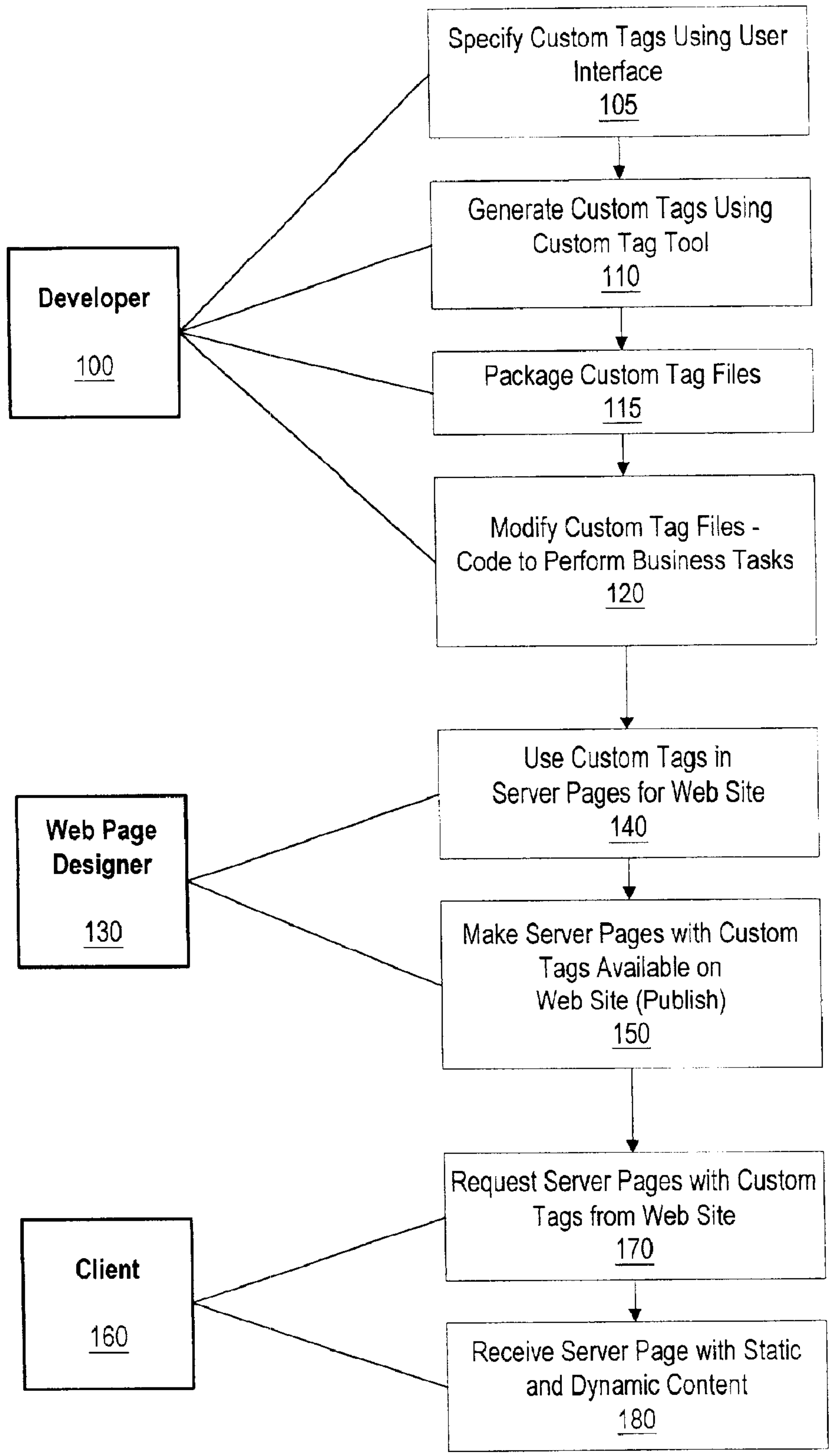
FIG. 1 is a high level diagram showing the tasks performed by various individuals in providing and using custom tags.

FIG. 1 is a high level diagram showing the tasks performed by various individuals in providing and using custom tags. Developer 100 uses a user interface included with the Custom Tag Wizard to specify general characteristics, or actions, of the custom tag the developer wishes to create (step 105). The Custom Tag Wizard generates custom tags according to the developer's specifications (step 110). In a client-server implementation, the generated custom tag files are dynamically packaged into a package file that is returned to the developer (step 115). The developer edits the generated custom tag files to add particular business logic in order to perform a desired business function (step 120). For example, the developer may edit the custom tag files to include code for a custom tag to retrieve a customer's current balance information from the company's database. The custom tag files with the added business logic are made available to Web page designer 130 for inclusion in Web pages.

Web page designer 130 often has less programming skills than developer 100. Web page designer 130 is typically trained to develop Web pages using the hypertext markup language (HTML) and extended markup language (XML) but often lacks skills needed to program Java code used in custom tags and Java applications. Web page designer 130 uses tags to code Java Server Pages (JSPs) that include standard tags as well as custom tags created by developer 100 (step 140). The Java Server Pages created by Web page designer 130 are made available to clients by publishing them on the business' Web site (step 150).

Client 160 requests server pages that include custom tags from the Web site (step 170). The Web site retrieves the Web Page (i.e., JSP) and resolves the static and dynamic text by processing the custom tags. The resulting Web page, with both static and dynamic content, are received by the client and displayed on the client's display using standard browser software (step 180).

Figure 2:
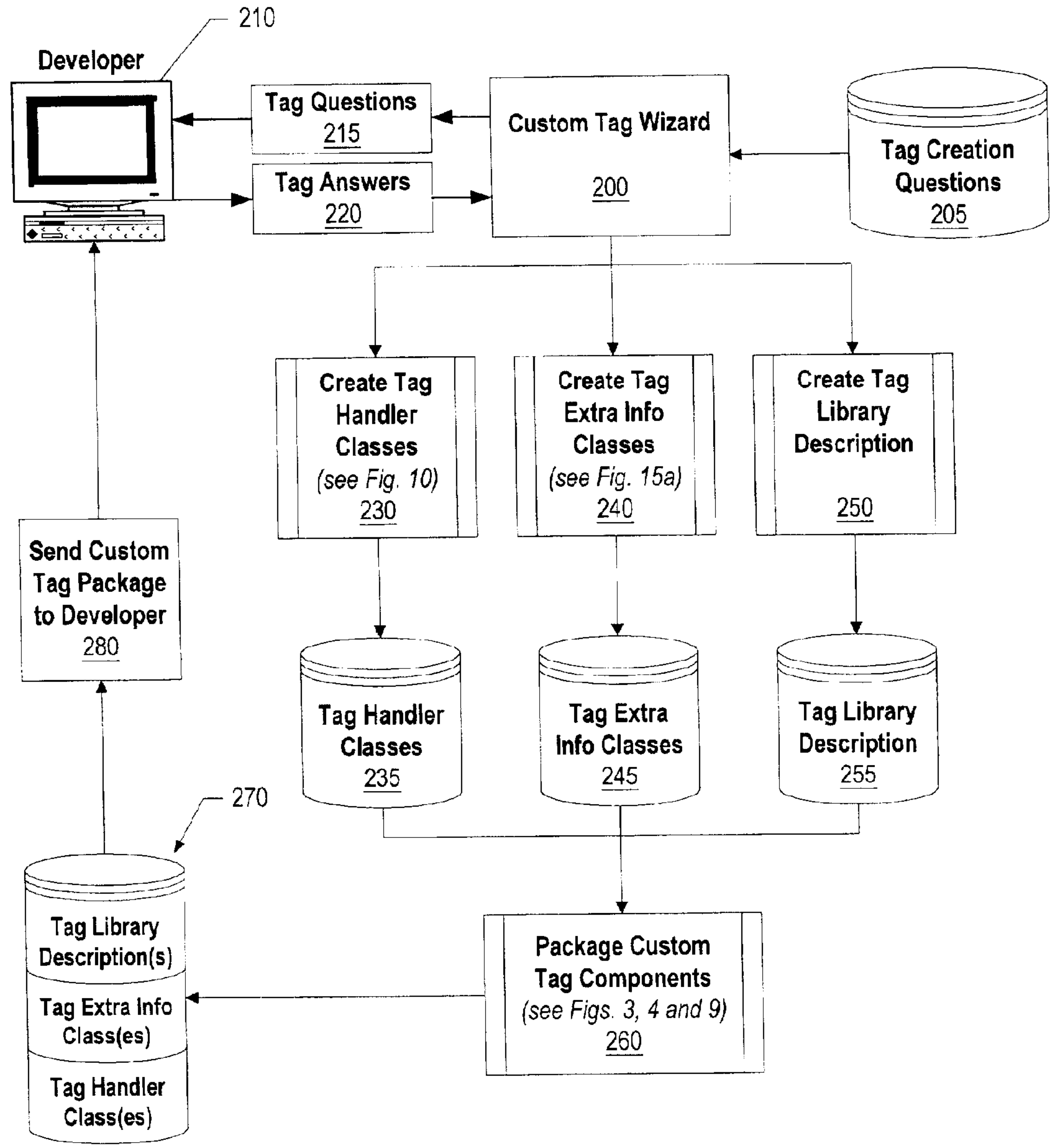
FIG. 2 is a high level diagram showing a Custom Tag Wizard used to create and package custom tag frameworks for a developer.
Figure 15A:
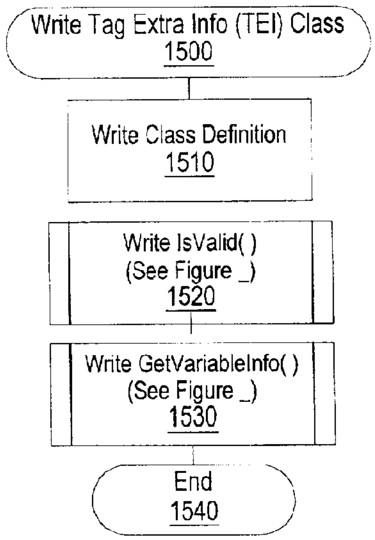
FIG. 15*a* is a high level flowchart showing the processing involved in writing a tag extra info (TEI) class.

FIG. 2 is a high level diagram showing a Custom Tag Wizard used to create and package custom tag frameworks for a developer. Developer 210 invokes Custom Tag Wizard 200 that reside either on the developer's computer system or on a server computer system. Custom Tag Wizard 200 reads custom tag creation questions 205 and provides tag questions 215 to developer 210. Developer 210 provides tag answers 220 in response to tag questions 215 and the custom tag characteristics that the developer wishes to create. When developer 210 requests that Custom Tag Wizard 200 generate custom tag files corresponding to the developer's custom tag requests, Custom Tag Wizard 200 creates tag handler classes (predefined process 230, see FIG. 10 for processing details), tag extra info (TEI) classes (predefined process 240, see FIG. 15*a* for processing details), and a tag library description (TLD) file (predefined process 250). The processing results in one or more tag handler classes 235, one or more tag extra info classes 245, an at least one tag library description files 255. In a client-server environment, the created custom tag files are packaged into package file 270 using predefined process 260 (see FIG. 3, 4, and 9 for processing details). Package file 270 is sent to the developer (step 280) for inclusion of business specific logic.

Figure 3:
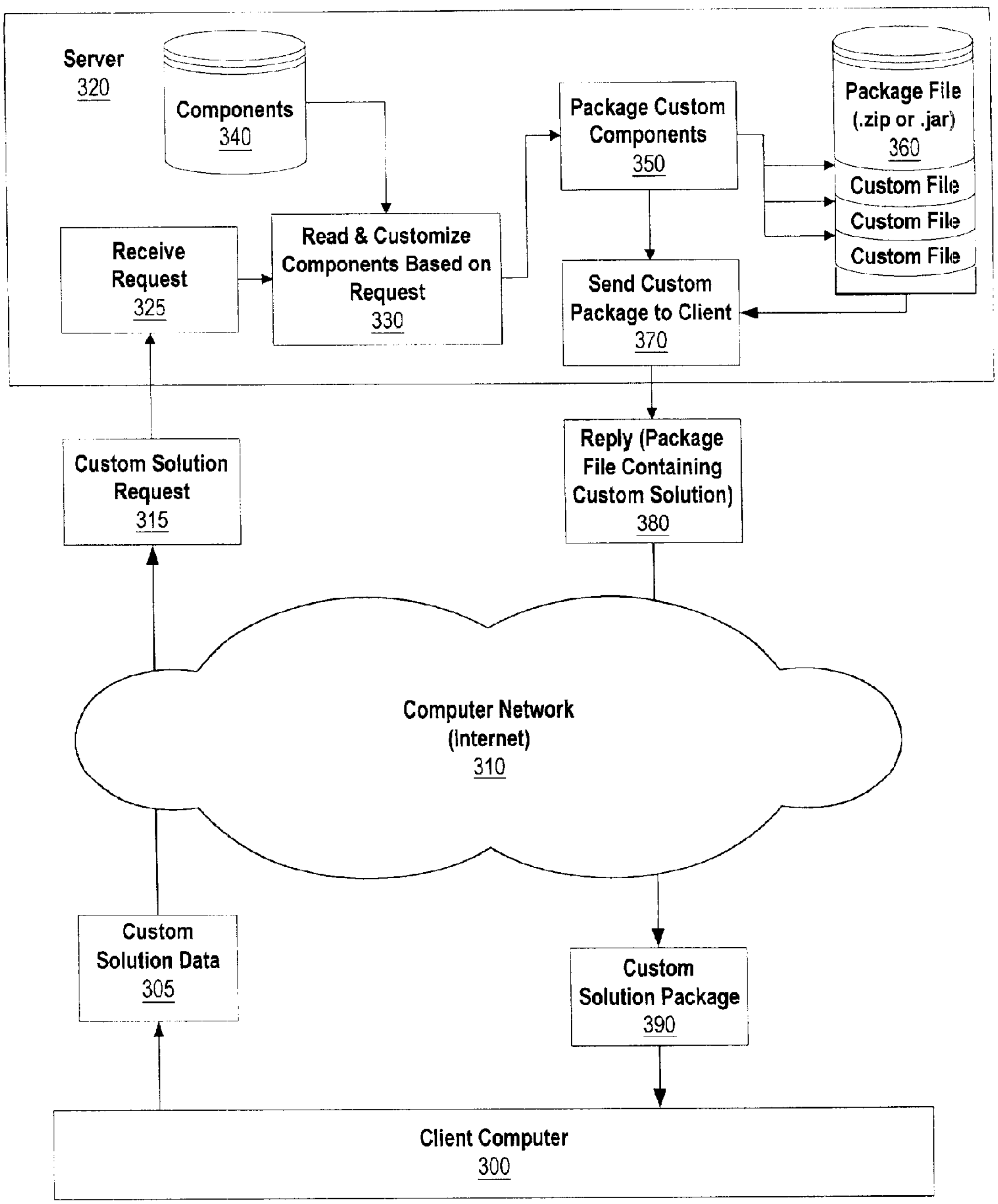
FIG. 3 is a high level diagram showing a server dynamically package custom components and return a resulting package to a client computer.

FIG. 3 is a high level diagram showing a server dynamically package custom components and return a resulting package to a client computer. Client 300 sends custom solution data 305, such as a request, through computer 310 (such as the Internet) to server 320. Server 320 receives custom solution request 315 from computer network 310 using receive request process 325. Server 320 processes the client's request. Processing includes reading and customizing one or more components 340 based on the clients request (process 330). Customizing components (step 330) may include reading standard files or packages from component data store 340, modifying standard files included in component data store 340 based on the client's request, dynamically creating new components not included in component data store 340, as well as any combination thereof.

Server 320 packages custom components requested by the client (process 350) resulting in package 360 which includes one or more component files. Package file 360 may be a "zip" file that is able to be processed by any number of zip utilities or might be a "jar" file which is a Java package that includes certain Java components. Server 320 sends package file 360 back the client computer (process 370). Reply 380 results from sending process 380 and includes the package file. Reply 380 is sent through computer network 310 to client computer 300. Client computer 300 receives package file 390 from the network. Client is then able to store package file 390 onto a nonvolatile storage device, such as a disk drive, and process the package file using a common zip utility (i.e., pkzip, winzip, etc.) to extract the component files.

Figure 4:
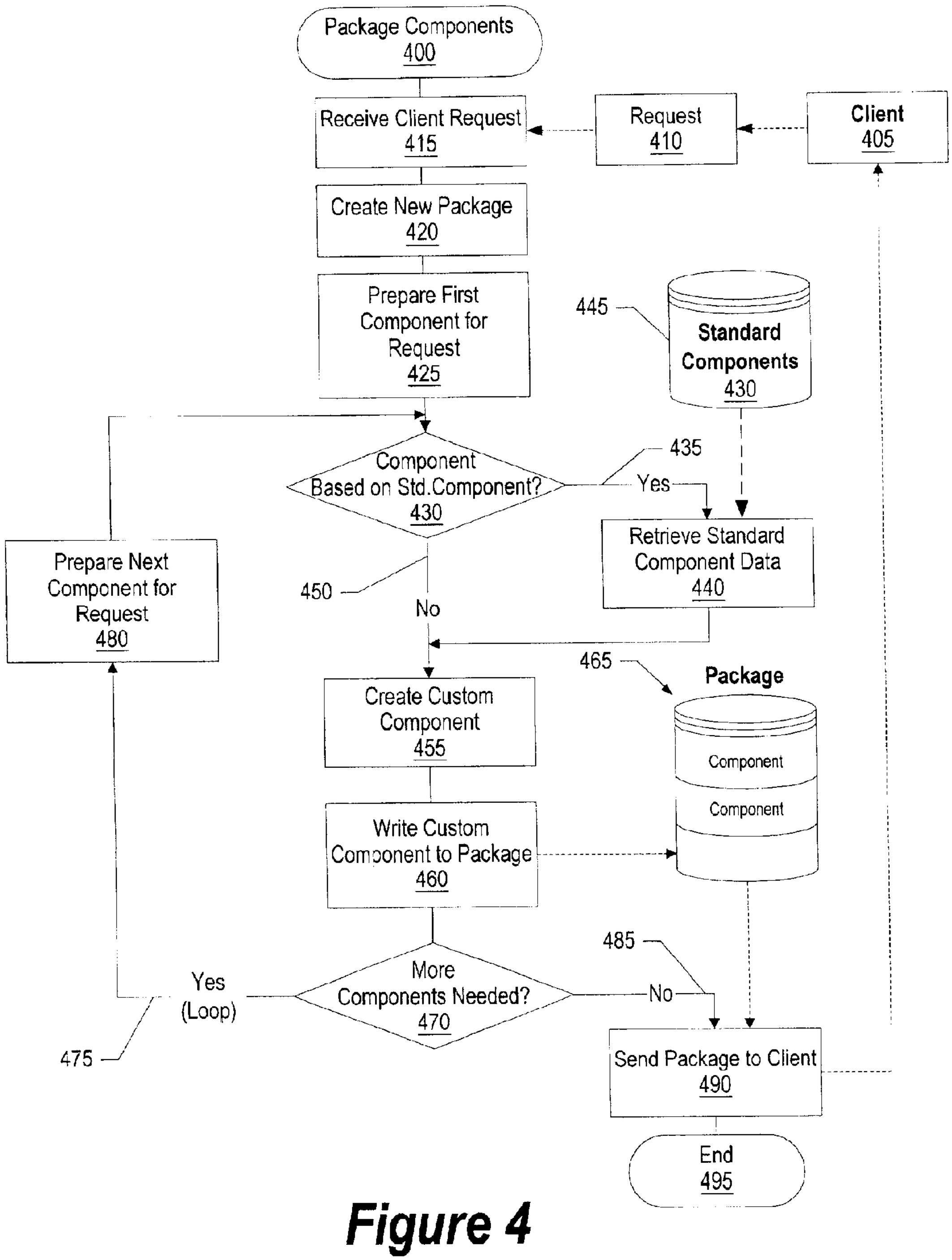
FIG. 4 is a flowchart showing the processing involved in dynamically packaging components and returning the resulting package file to a client.

FIG. 4 is a flowchart showing the processing involved in dynamically packaging components and returning the resulting package file to a client. Package processing commences at 400 whereupon request 410 from client 405 is received (step 415). Create new package processing 420 commences in response to determining that request 410 is for creation of a package file.

The first component included in the request is prepared (step 425). A determination is made as to whether the component request is based on a standard component (decision 430). If the component request is based on a standard component (such as a boilerplate file), decision 430 branches to "yes" branch 435 whereupon the standard component is received (step 440) from standard component data store 445 (such as a library of boilerplate files). On the other hand, if the component is not based on a standard component, decision 430 branches to "no" branch 450 bypassing the retrieval of a standard component.

A custom component is created (step 455) either dynamically or based on a retrieved standard component. If based on a retrieved standard component, step 455 may or may not change the standard component. The component is written (step 460) to package file 465.

A determination is made as to whether more components need to be retrieved or created to respond to the client's request (decision 470). If more components are needed, decision 470 branches to "yes" branch 475 which prepares the next component for the request (step 480) and loops back to process the next component. This looping continues until no more components are needed, at which time decision 470 branches to "no" branch 485 whereupon package file 465 is sent to client 405 (step 490), and processing ends at 495.

Figure 5:
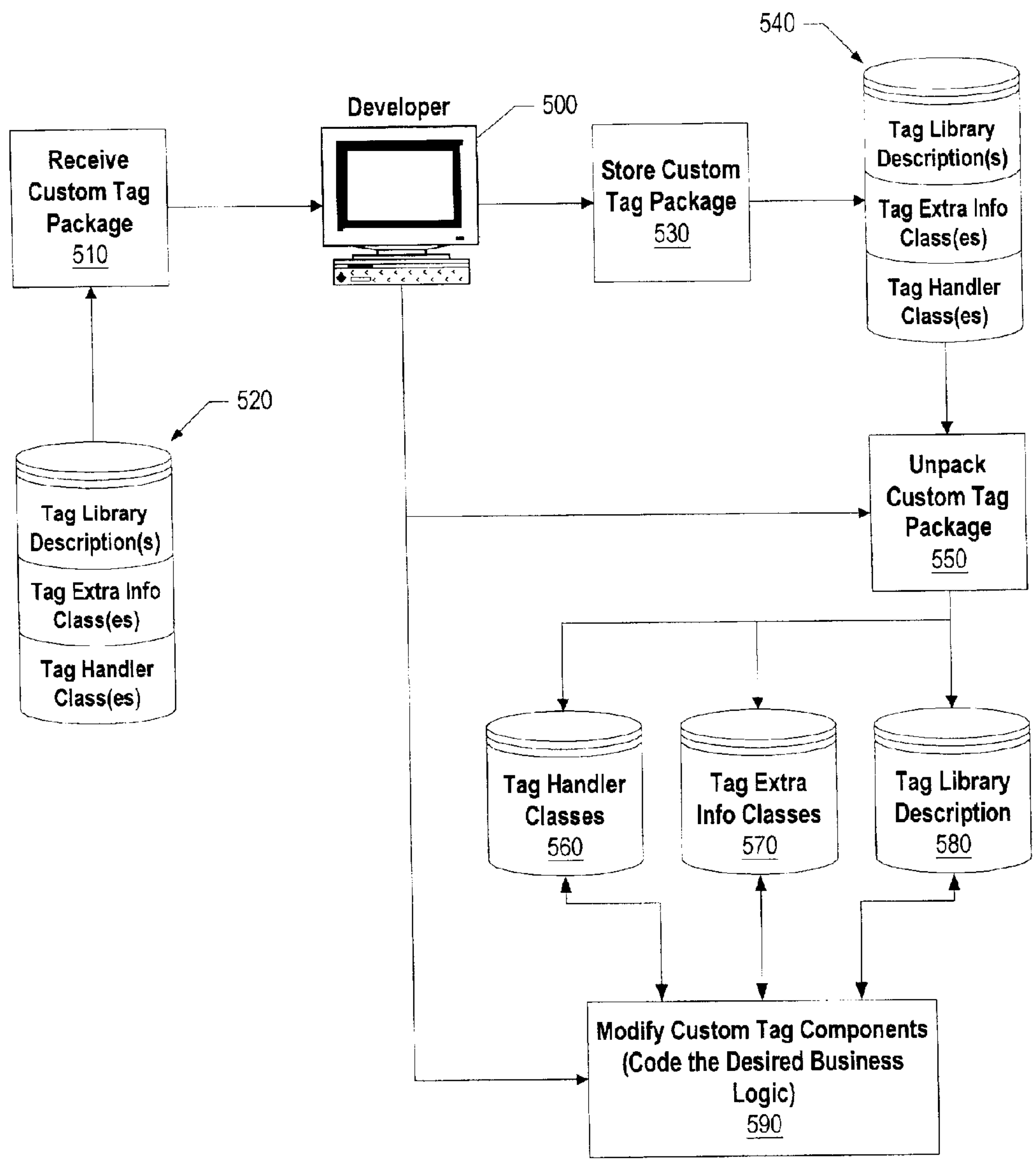
FIG. 5 is a high level diagram showing a developer receiving a custom tag package and using components within the custom tag package to create custom tags.

FIG. 5 is a high level diagram showing a developer receiving a custom tag package and using components within the custom tag package to create custom tags. Developer 500 receives custom tag package 520 using process 510. Developer 500 stores custom tag package 540 on a nonvolatile storage device accessible by the developer's computer system (process 530). Developer 500 unpacks the received package file using an unpacking utility, such as pkzip, winzip, etc. (process 550). Unpacking package file 540 results in one or more tag handler class files 560, one or more tag extra info (TEI) class files 570, and a tag library description file 580. Developer 500 modifies the unpacked class files (process 590) using an editor to add the business logic that the developer desires, such as retrieving a customer's account balance from a database.

Figure 6:
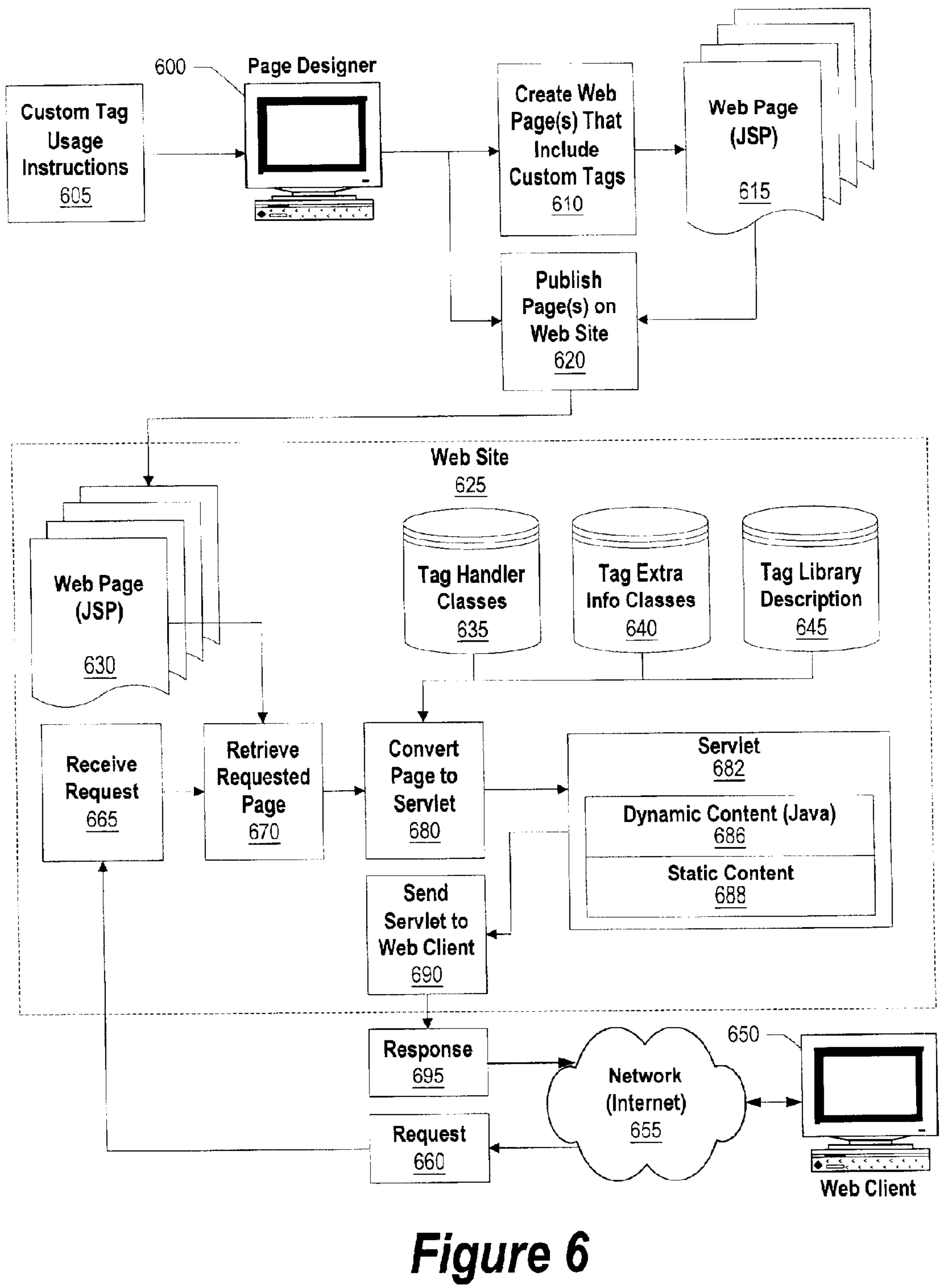
FIG. 6 is a high level diagram showing a web page designer using custom tags in a Web page and processing resulting when a client computer requests the Web page.

FIG. 6 is a high level diagram showing a web page designer using custom tags in a Web page and processing resulting when a client computer requests the Web page. Page designer 600 receives custom tag usage instructions 605 corresponding to newly created custom tags that were created by a developer. Page designer 600 creates Web pages (Java Server Pages) that include one or more custom tags that were provided by the developer (process 610) resulting in Web page 615. Page designer 600 makes Web page 615 available to Web clients by publishing Web page 615 onto Web site 625 (process 620). Published Web page 630 is stored on Web Site 625 in an area accessible to Web client 650. In addition, the developer published the tag handler class files 635, tag extra info (TEI) class files 640, and tag library description files 645 that include processing details for handling the custom tags included in published Web page 630.

Web client uses a standard browser (such as Netscape's Navigator™ software or Microsoft's Internet Explorer™ software) to use computer network 655 (i.e., the Internet) to access Web site 625. Web client 650 sends request 660 to Web site 625 requesting published Web page 630.

Web site 625 receives the client request (process 665) and determines that the client is requesting published Web page 630. As a result, Web site 625 retrieves Web page 630 (process 670). The Web page, being a Java Server Page, is converted into servlet 682 using process 680. Servlet 682 includes dynamic content 686 which is written in Java and adapted to be executed by a Java Virtual Machine (JVM) running on the Web client's computer system. Servlet 682 also includes static content 688, such as standard HTML or XML code. Resulting servlet 682 is executed and writes a combination of static and dynamic text to the response object. That text, in turn, is returned to the Web client (step 690) as response 695. Web client 650 receives response 695 and the resulting dynamic and static content is displayed using the client's browser software and a Java Virtual Machine on the client's computer is used to process the dynamic content.

Figure 7:
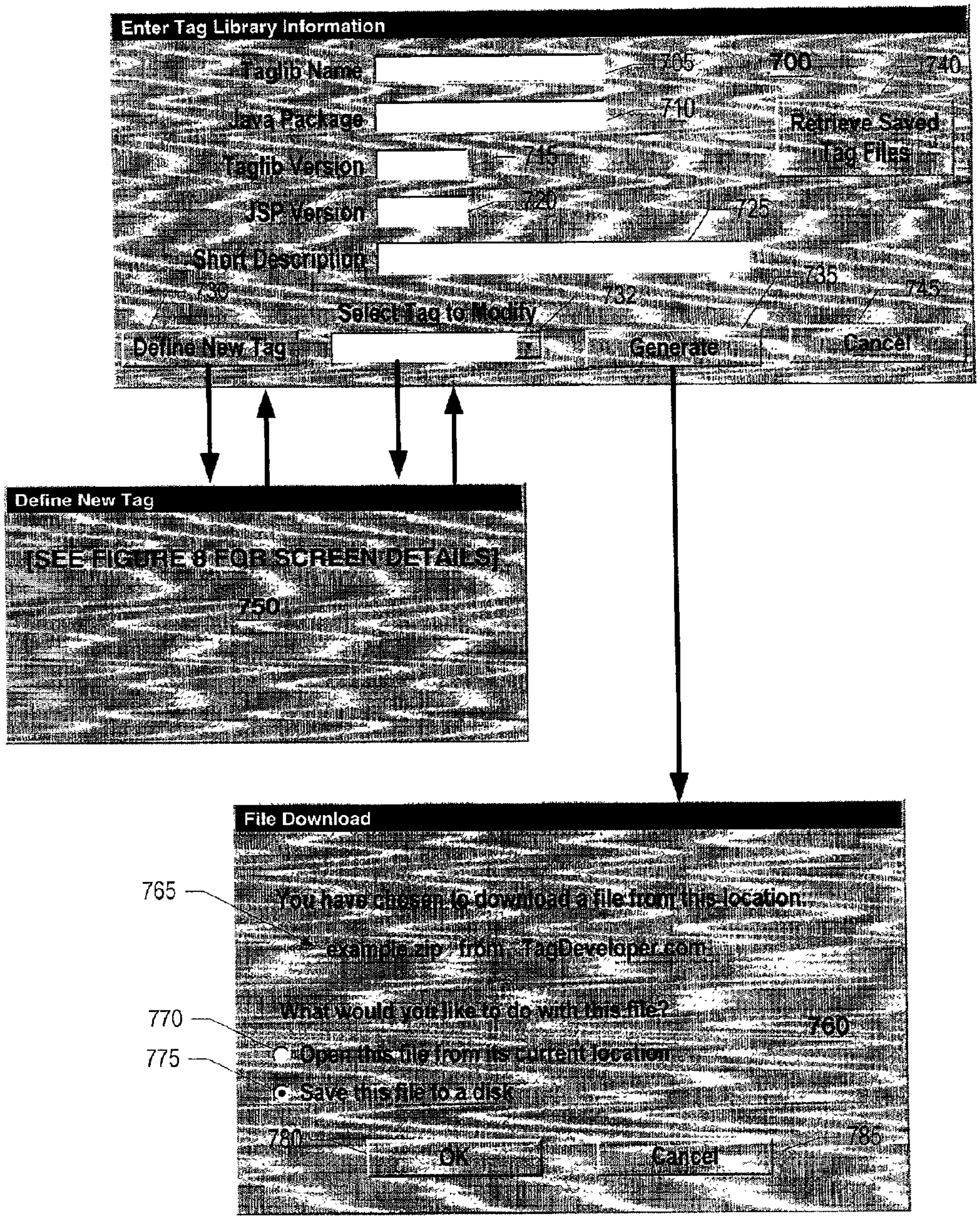
FIG. 7 is a screen flow showing various screens used to create and receive a custom tag framework package.

FIG. 7 is a screen flow showing various screens used to create and receive a custom tag framework package. Screen 700 is a screen used by the developer to enter tag library information about a tag being created. The developer supplies tag library (taglib) name 705, Java package name 710, taglib version number 715, Java Server Page (JSP) version number 720, and short description 725.

To define new tags to include in the tag library, the developer selects "Define New Tag" command button 730. In response, Define New Tag screen 750 is displayed with detailed questions regarding the tag that the developer wishes to create (see FIG. 8 for screen details). When the developer is finished creating a tag he is returned to screen 700. The developer can create multiple new tags by repeatedly selecting "Define New Tag" command button 730 and providing information about the new tags in screen 750. To modify a tag that was previously created, the developer selects the tag from tag modify list box 732. In response, the current information pertaining to the selected tag is loaded and displayed to the developer in screen 750. When the developer is finished developing tags he selects "Generate" command button 735. In a client-server environment, command button 735 results in the custom tag files being dynamically generated, packaged and returned to the developer in File Download screen 760. In a non-client-server environment, command button 735 generates the custom tag files.

File Download screen 760 informs the developer that he can download the newly created package file (screen text 765). The developer is presented with a choice to either open the file from its current location (option button 770) or save the file to a disk accessible to the developer (option button 775). The developer selects option button 775 and selects "OK" command button 780 to download the file to a disk location that he can specify or selects "Cancel" command button 785 to cancel the operation and not save the file to a disk location.

Screen 700 also includes command button 740 to retrieve previously saved custom tag files so they can be edited and new tags can be added to the package of custom tags by selecting "Define New Tag" command button 730. If the developer wishes to cancel entering tag library information, he selects "Cancel" command button 745.

Figure 8:
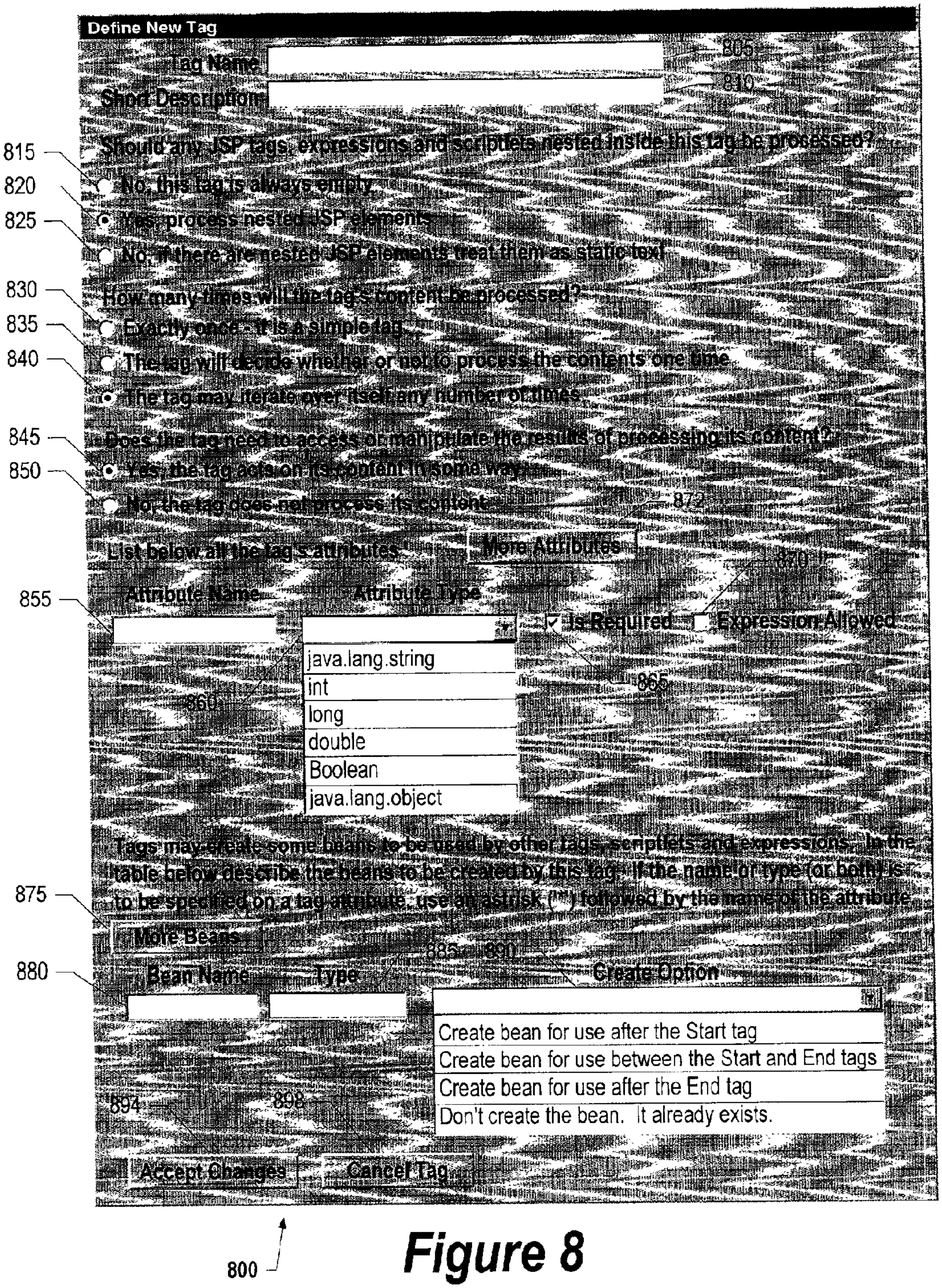
FIG. 8 is a screen design of a page to gather custom tag information from a developer.

FIG. 8 is a screen design of a page to gather custom tag information from a developer. Define New Tag Screen 800 is displayed in response to a developer requesting to define a new tag (see command button 730 in FIG. 7).

The developer enters tag name 805 which is a name that will be used to refer to the custom tag in a Java Server Page. The developer can also enter short description 810 describing the tag.

The developer selects an option in response to the question, "Should any JSP tags, expressions and scriptlets nested inside this tag be processed?" The options available to the developer include option 815 ("No, this tag is always empty"), option 820 ("Yes, process nested JSP elements"), and option 825 ("No, if there are nested JSP elements treat them as static text"). The developer selects one of the included options.

The developer selects another option in response to the question, "How many times will this tag's content be processed?" The options available to the developer include option 830 ("Exactly once—it is a simple tag"), option 835 ("The tag will decide whether or not to process the contents one time"), and option 840 ("The tag may iterate over itself any number of times").

The developer selects another option in response to the question, "Does the tag need to access or manipulate the results of processing its content?" The options available to the developer include option 845 ("Yes, the tag acts on its content in some way") and option 850 ("No, the tag does not process its content").

The developer also describes any attributes that are used by the tag. The developer provides attribute name 855 and an attribute type for each attribute. Attribute type can be selected from the list of available attributes in list box 860. List box 860 includes attribute types of java.lang.string (for string attributes), int (for integer attributes), long (for long number attributes), double (for double number attributes), Boolean (for Boolean attributes), and java.lang.object (for Java object attributes). The developer also selects whether the attribute is required using checkbox control 865 and whether an expression is allowed as an attribute using checkbox control 870. If more attributes are needed, the developer selects More Attributes command button 872 whereupon additional text boxes and controls are displayed for the developer to add information about additional attributes.

Custom tags may create some Java beans that can be used by other tags, scriptlets and expressions. These Java beans are described by the developer. If additional bean descriptions are needed the developer selects More Beans command button 875 whereupon additional text boxes and controls are added to screen 800 to describe the additional beans. The developer enters bean name 880 and the type of bean 885. If bean name 880 and/or bean type 885 are specified as a tag attribute, the developer is asked to type an asterisk ("*") followed by the name of the attribute in the text boxes supplied. The developer also selects a Java bean creation option using list box control 890. Options included in list box control 890 include "Create bean for use after the Start tag," "Create bean for use between the Start and End tags," "Create bean for use after the End tag," and "Don't create the bean. It already exists."

When the developer is finished providing information for the custom tag he either selects Accept Changes command button 894 to accept the changes made on the screen and store the tag information for future generation of tag files (see Generate command button 735 in FIG. 7) and return to the Enter Tag Library Information screen (see screen 700 in FIG. 7). If the developer does not wish to save the tag information he selects Cancel Tag command button 898.

Figure 9:
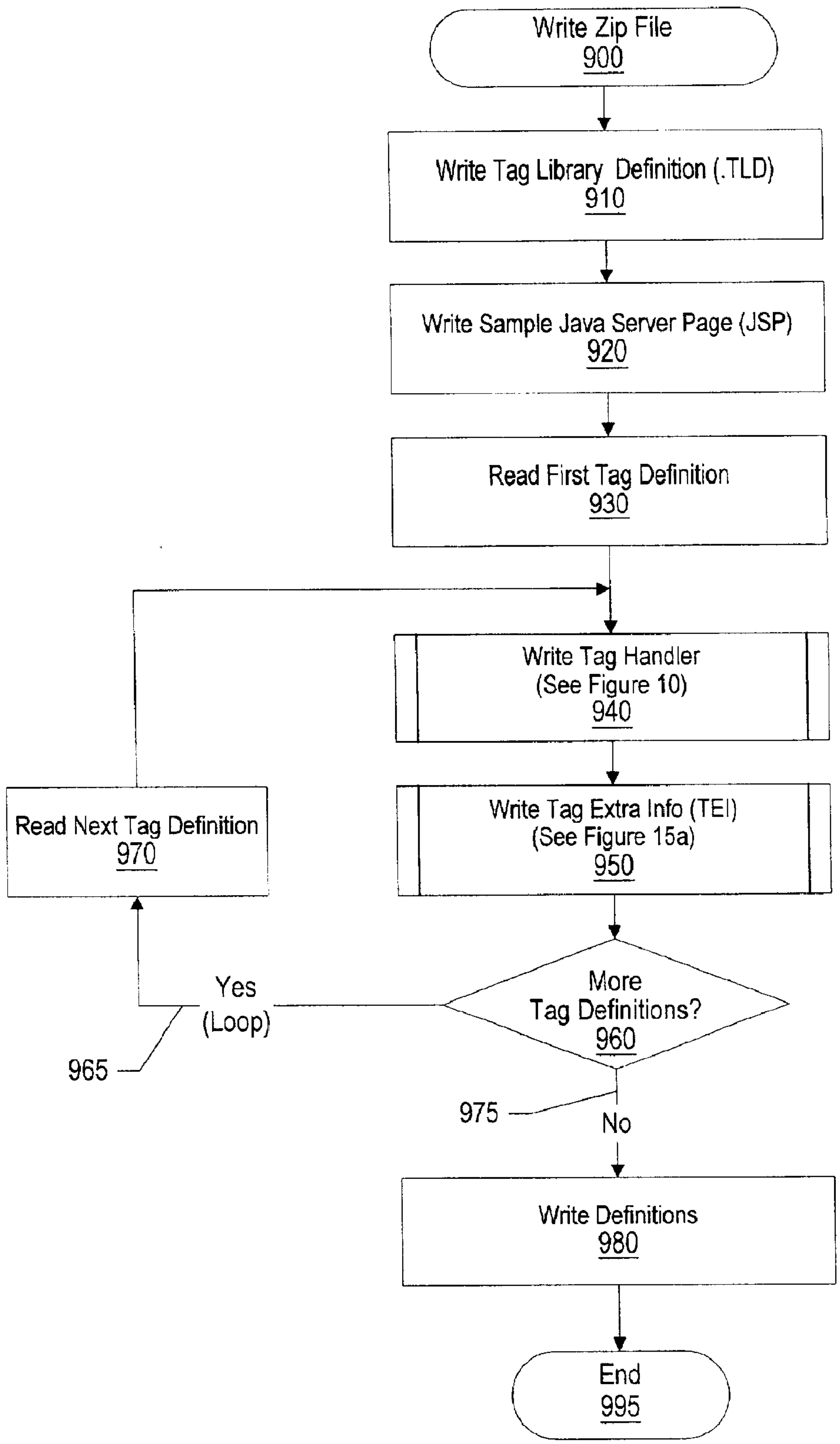
FIG. 9 is a high level flowchart showing the processing involved in preparing the custom tag package.

FIG. 9 is a high level flowchart showing the processing involved in preparing the custom tag package. Processing commences at 900 whereupon the tag library definition (.TLD) file is written (step 910). A sample Java Server Page (JSP) is written to the package (step 920). The information about the first custom tag that the developer described (see FIG. 8) is read (step 930). The tag handler class file is written (predefined process 940, see FIG. 10 for further processing details). The tag extra info (TEI) class file is written (predefined process 950, see FIG. 15*a* for further processing details).

A determination is made as to whether there are more tag definitions that need to be processed (decision 960). If there are more tag definitions, decision 960 branches to "yes" branch 965 whereupon the next tag definition information is read (step 970) and processing loops back to process the next tag's tag handler and TEI files. This looping continues until there are no more tag definitions to process, at which time decision 960 branches to "no" branch 975.

The tag definitions (i.e., the developer's responses to the tag generation questions) are written to the package so that they can be read by the Custom Tag Wizard for modification and creation of additional tags within the tag package (step 980). Processing for writing the package file ends at 995.

Figure 10:
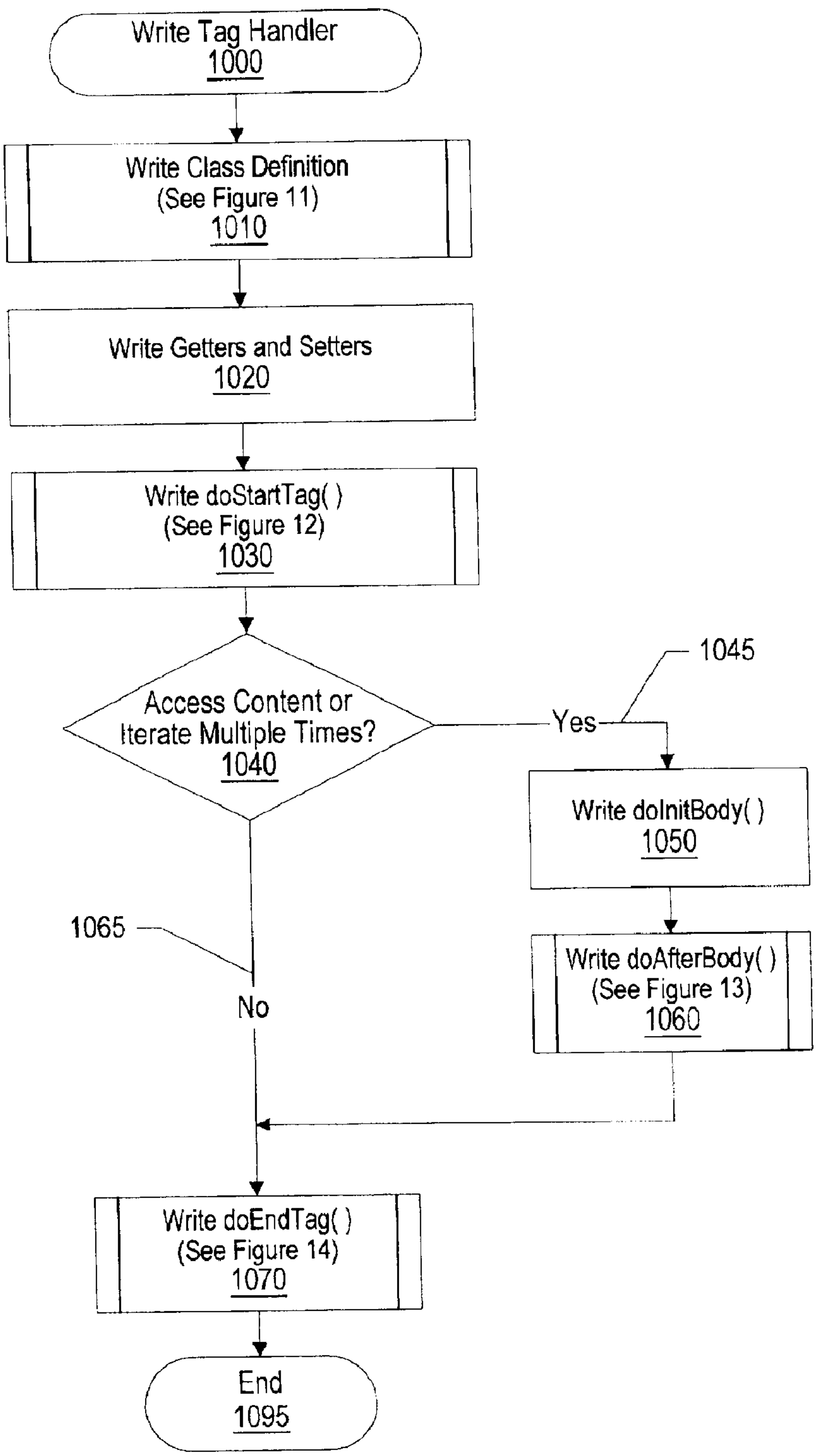
FIG. 10 is a high level flowchart showing the processing involved in writing a custom tag handler class.

FIG. 10 is a high level flowchart showing the processing involved in writing a custom tag handler class. Processing commences at 1000 whereupon the class definition for the tag handler is written (predefined process 1010, see FIG. 11 for processing details). Getters and Setters are written for attributes used by the tag (step 1020). The doStartTag( ) method for the tag handler is written (predefined process 1030, see FIG. 12 for processing details).

A determination is made, based on the developer's responses to tag questions (see FIG. 8), as to whether the tag accesses its content or iterates multiple times (decision 1040). If the tag accesses its content or iterates multiple times, decision 1040 branches to "yes" branch 1045 whereupon the doInitBody( ) method is written (step 1050) as well as the doAfterBody( ) method (predefined process 1060, see FIG. 13 for processing details). On the other hand, if the tag does not access its content and does not iterate multiple times, decision 1040 branches to "no" branch 1045 bypassing the writing of the doInitBody( ) and doAfterBody( ) methods. The doEndTag( ) method is written (predefined process 1070, see FIG. 14 for processing details). Processing for writing the tag handler ends at 1095.

Figure 11:
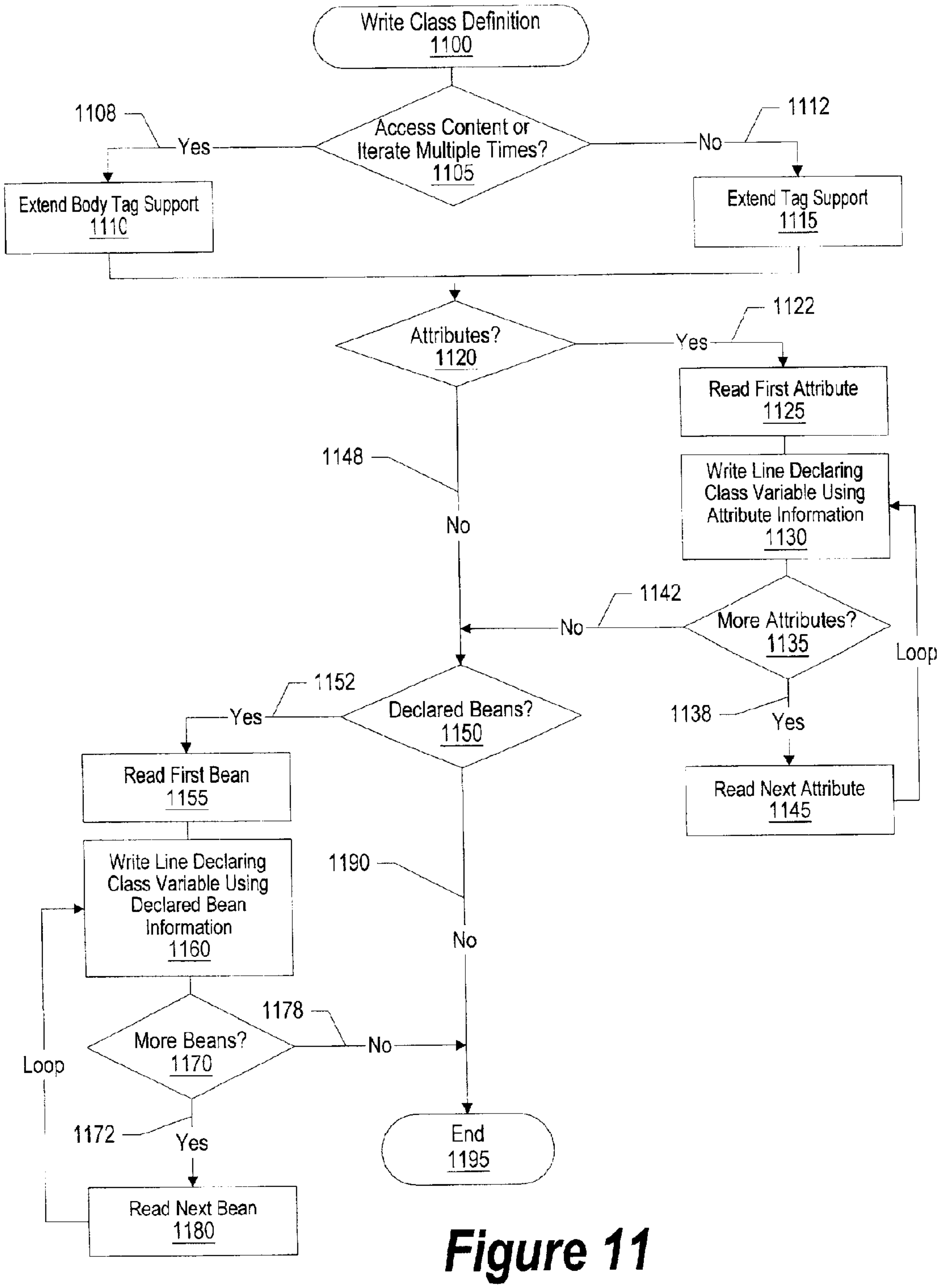
FIG. 11 is a flowchart showing the processing involved in writing the class definition included in the tag handler.

FIG. 11 is a flowchart showing the processing involved in writing the class definition included in the tag handler. Processing commences at 1100 whereupon a determination is made, based on the developer's responses to tag questions (see FIG. 8), as to whether the tag accesses its content or iterates multiple times (decision 1105). If the tag accesses its content or iterates multiple times, decision 1105 branches to "yes" branch 1108 whereupon code is written to extend body tag support (step 1110, see Appendix G, footnote 1, for an example). On the other hand, if the tag does not access its content and does not iterate multiple times, decision 1105 branches to "no" branch 1112 whereupon code is written to extend tag support (step 1115, see Appendix A, footnote 1, for an example).

A determination is made as to whether the tag includes one or more attributes (decision 1120). If the tag includes one or more attributes, decision 1120 branches to "yes" branch 1122 whereupon the first attribute is read (step 1125) and a line is written declaring a class variable using the attribute information (step 1130, see Appendix G, footnote 2, for an example). A determination is made as to whether there are more attributes to process (decision 1135). If there are more attributes, decision 1135 branches to "yes" branch 1138 whereupon information regarding the next attribute is read (step 1145) and processing loops back to write a line declaring a class variable using this attribute information. This looping continues until there are no more attributes to process, at which time decision 1135 branches to "no" branch 1142.

If there are no attributes to process, decision 1120 branches to "no" branch 1148 and when all attributes have been processed decision 1135 branches to "no" branch 1142 whereupon processing continues to determine whether the tag definition includes any declared beans (decision 1150). Decision 1150 is based on information that was provided to the process (see developer user interface screen in FIG. 8). If there are declared beans, decision 1150 branches to "yes" branch 1152 to process the beans. Information about the first bean is read (step 1155) and a line is written declaring a class variable using the declared bean information (step 1160, see Appendix O, footnote 1, for an example). A determination is made as to whether there are more beans to process (decision 1170). If there are more beans, decision 1170 branches to "yes" branch 1172 whereupon information regarding the next bean is read (step 1180) and processing loops back to write a line declaring a class variable using the declared bean information (step 1160). This looping continues until there are no more beans to process, at which time decision 1170 branches to "no" branch 1178. If there are no beans to process, decision 1150 branches to "no" branch 1190 and when all beans have been processed decision 1170 branches to "no" branch 1178 whereupon processing ends at 1195.

Figure 12:
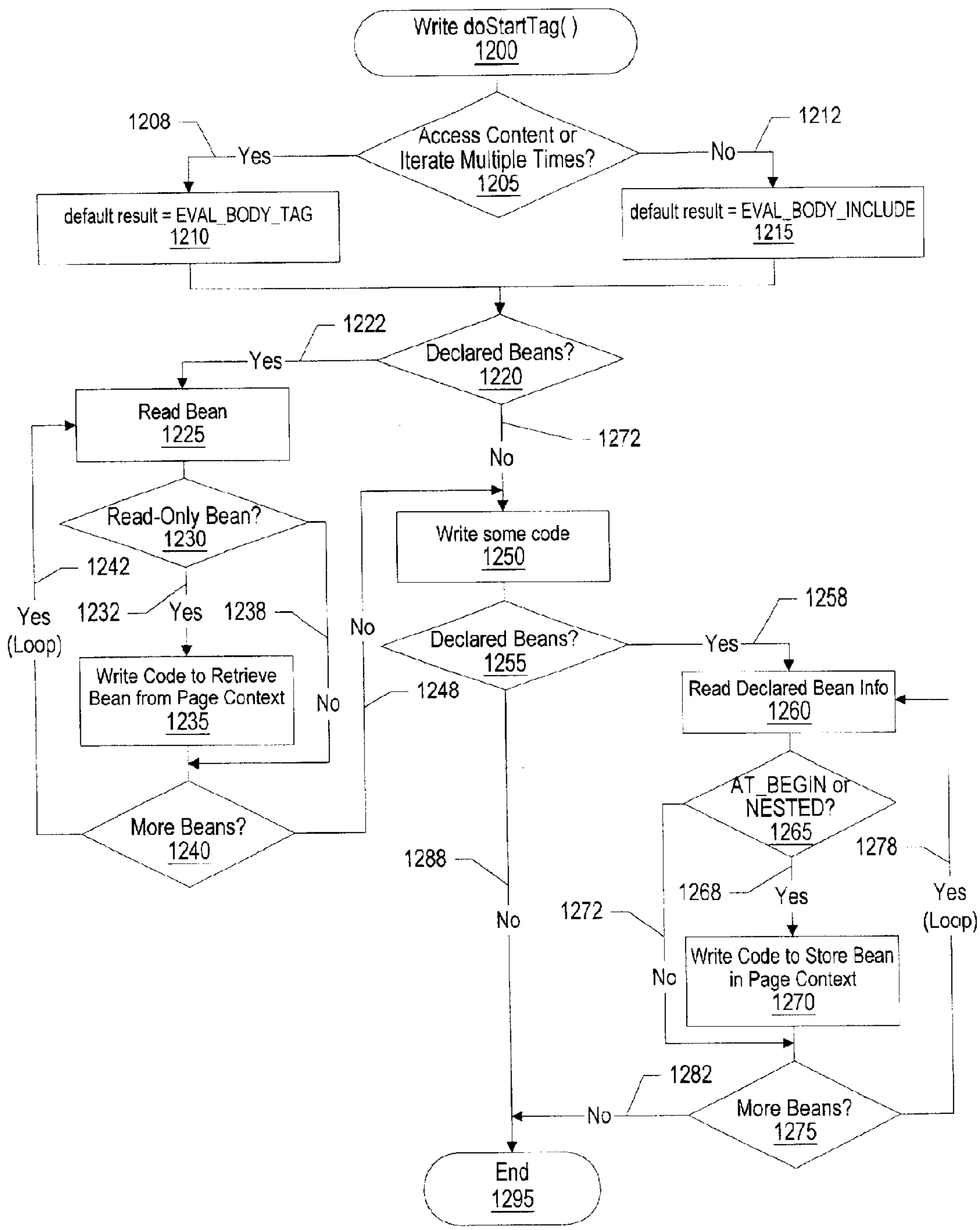
FIG. 12 is a flowchart showing the processing involved in writing the doStartTag( ) method included in the tag handler.

FIG. 12 is a flowchart showing the processing involved in writing the doStartTag( ) method included in the tag handler. Processing commences at 1200 whereupon a determination is made, based on the developer's responses to tag questions (see FIG. 8), as to whether the tag accesses its content or iterates multiple times (decision 1205). If the tag accesses its content or iterates multiple times, decision 1205 branches to "yes" branch 1208 whereupon code is written for the default result to be "EVAL_BODY_TAG" (step 1210, see Appendix K, footnote 1, for an example). On the other hand, if the tag does not access its content and does not iterate multiple times, decision 1205 branches to "no" branch 1212 whereupon code is written for the default result to be "EVAL_BODY_INCLUDE" (step 1215, see Appendix C, footnote 1, for an example).

A determination is made as to whether the tag includes any declared beans (decision 1220). Decision 1220 is based on information that was provided to the process (see developer user interface screen in FIG. 8). If there are declared beans, decision 1220 branches to "yes" branch 1222 to process the beans. Information about the first bean is read (step 1225). A determination is made as to whether the bean is a read-only bean (decision 1230). If the bean is a read only bean, decision 1230 branches to "yes" branch 1232 whereupon code is written to retrieve the bean from page context (step 1235, see Appendix S, footnote 1, for an example). On the other hand, if the bean is not a read-only bean, decision 1230 branches to "no" branch 1238 bypassing step 1235. A determination is made as to whether there are more beans to process (decision 1235). If there are more beans, decision 1235 branches to "yes" branch 1242 whereupon processing loops back to read information regarding the next bean (step 1225) and process the bean accordingly. This looping continues until there are no more beans to process, at which time decision 1240 branches to "no" branch 1248.

Some code is written to the doStartTag( ) method (step 1250) after declared beans have been processed ("no" branch 1242) or if there were no beans to process (decision 1220 branching to "no" branch 1272). Another determination is made as to whether the tag includes any declared beans (decision 1255). If there are no declared beans, decision 1265 branches to "no" branch 1288 and processing ends at 1295. On the other hand, if there are declared beans, decision 1255 branches to "yes" branch 1258 to process the beans. Information about the first bean is read (step 1260). A determination is made as to whether the bean is created for use after the start tag ("AT_BEGIN") or between the start and end tags ("NESTED") (decision 1265). If decision 1265 is true, then "yes" branch 1268 is taken whereupon code is written to store the bean in page context (step 1270, see Appendix S, footnote 2, for an example). On the other hand, if decision 1265 is false, "no" branch 1272 is taken bypassing step 1270. A determination is made as to whether there are more beans to process (decision 1275). If there are more beans, decision 1275 branches to "yes" branch 1278 whereupon processing loops back to read information regarding the next bean (step 1265) and process the bean accordingly. This looping continues until there are no more beans to process, at which time decision 1275 branches to "no" branch 1282 whereupon processing ends at 1295.

Figure 13:
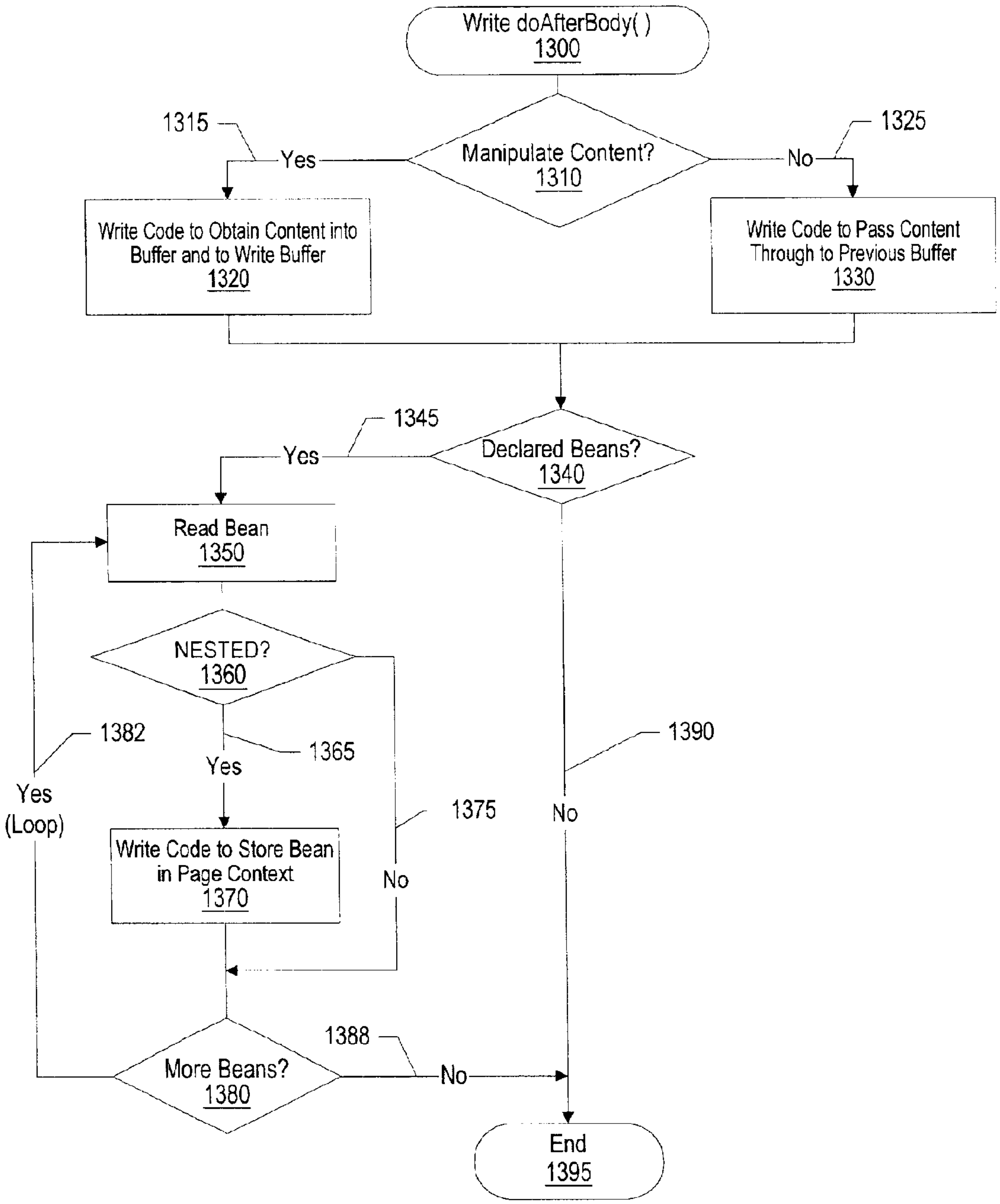
FIG. 13 is a flowchart showing the processing involved in writing the doAfterBody( ) method included in the tag handler.

FIG. 13 is a flowchart showing the processing involved in writing the doAfterBody( ) method included in the tag handler. Processing commences at 1300 whereupon a determination is made, based on the developer's responses to tag questions (see FIG. 8), as to whether the tag accesses its content (decision 1310). If the tag accesses its content, decision 1310 branches to "yes" branch 1315 whereupon code is written to obtain content into a buffer and write the buffer (step 1320, see Appendix P, footnote 1, for an example). On the other hand, if the tag does not access its content and does not iterate multiple times, decision 1310 branches to "no" branch 1325 whereupon code is written to pass the content through to a previous buffer (step 1330, see Appendix H, footnote 1, for an example).

A determination is made as to whether the tag includes any declared beans (decision 1340). Decision 1340 is based on information that was provided to the process (see developer user interface screen in FIG. 8). If there are no declared beans, decision 1340 branches to "no" branch 1390 and processing ends at 1395. On the other hand, if there are declared beans, decision 1340 branches to "yes" branch 1345 to process the beans. Information about the first bean is read (step 1350). A determination is made as to whether the bean is nested between the start and end tags (decision 1360). If the bean is nested, decision 1360 branches to "yes" branch 1365 whereupon code is written to store the bean in page context (step 1370). On the other hand, if the bean is not nested, decision 1360 branches to "no" branch 1375 bypassing step 1370. A determination is made as to whether there are more beans to process (decision 1380). If there are more beans, decision 1380 branches to "yes" branch 1382 whereupon processing loops back to read information regarding the next bean (step 1350) and process the bean accordingly. This looping continues until there are no more beans to process, at which time decision 1380 branches to "no" branch 1388 and processing ends at 1395.

Figure 14:
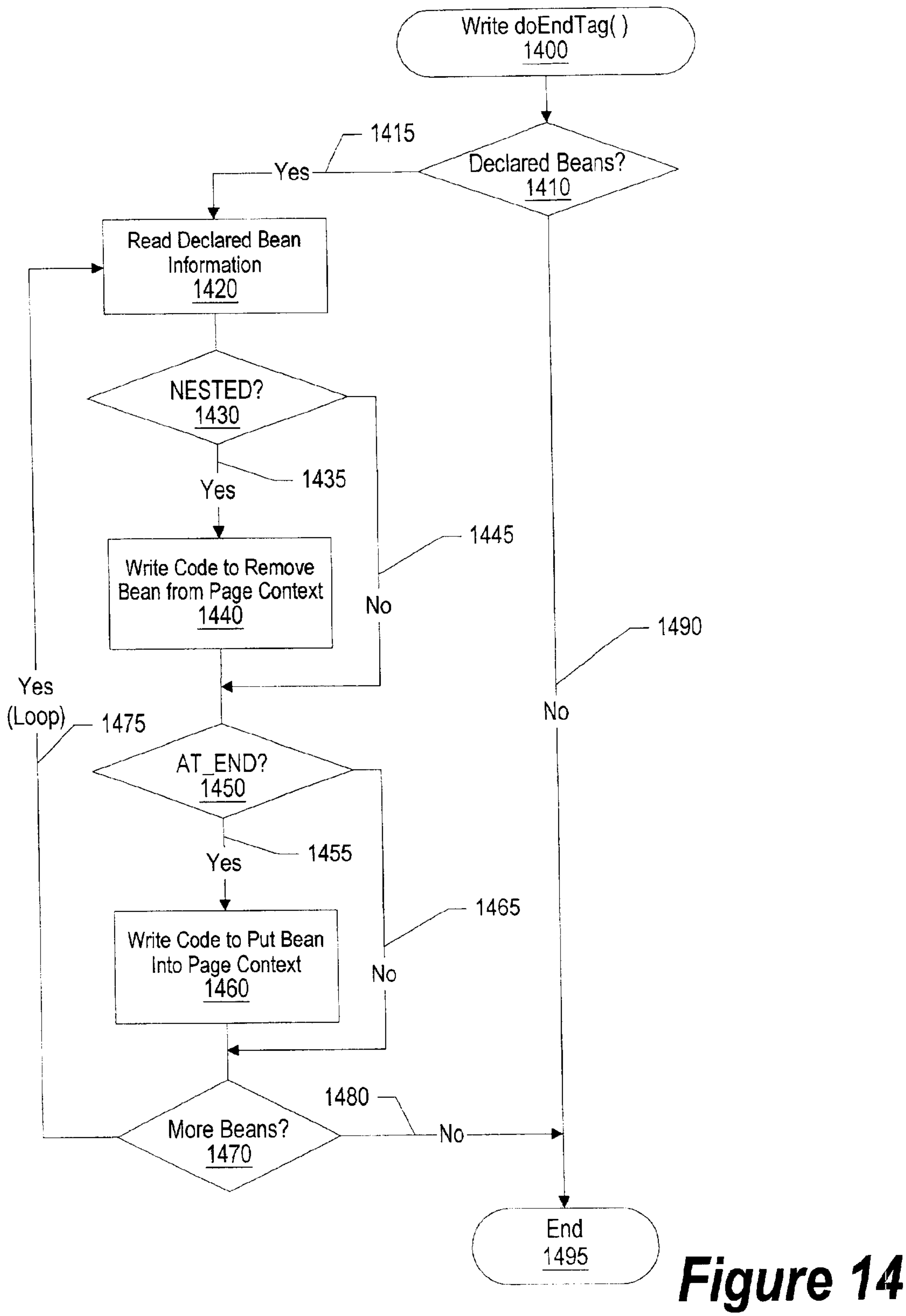
FIG. 14 is a flowchart showing the processing involved in writing the doEndTag( ) method included in the tag handler.

FIG. 14 is a flowchart showing the processing involved in writing the doEndTag( ) method included in the tag handler. A determination is made as to whether the tag includes any declared beans (decision 1410). Decision 1410 is based on information that was provided to the process (see developer user interface screen in FIG. 8). If there are no declared beans, decision 1410 branches to "no" branch 1490 and processing ends at 1495. On the other hand, if there are declared beans, decision 1410 branches to "yes" branch 1415 to process the beans. Information about the first bean is read (step 1420). A determination is made as to whether the bean is nested between the start and end tags (decision 1430). If the bean is nested, decision 1430 branches to "yes" branch 1435 whereupon code is written to remove bean from page context (step 1440, see Appendix Q, footnote 2, for an example). On the other hand, if the bean is not nested, decision 1430 branches to "no" branch 1445 bypassing step 1440.

A determination is made as to whether the bean is used after the "end" tag for the custom tag (decision 1450). If it is available after the "end" tag, decision 1455 branches to "yes" branch 1455 whereupon code is written to put the bean into the page context (step 1460, see Appendix Q, footnote 1, for an example). On the other hand, if the bean is not available after the end tag, decision 1460 branches to "no" branch 1465 bypassing step 1460.

A determination is made as to whether there are more beans to process (decision 1470). If there are more beans, decision 1470 branches to "yes" branch 1475 whereupon processing loops back to read information regarding the next bean (step 1420) and process the bean accordingly. This looping continues until there are no more beans to process, at which time decision 1470 branches to "no" branch 1480 and processing ends at 1495.

FIG. **15*a* is a high level flowchart showing the processing involved in writing a tag extra info (TEI) class. Processing commences at 1500 whereupon class definition information is written to the TEI class file (step 1510). The IsValid( ) method for the TEI class is written (predefined process 1520, see FIG. 15*b* for processing details) based on information provided from the developer (see FIG. 8). The GetVariableInfo( ) method for the TEI class is also written to the TEI class file (predefined process 1530, see FIG. 16 for processing details) based on information provided from the developer (see FIG. 8). Write tag extra info processing ends at 1540**.

FIG. **15*b* is a flowchart showing the processing involved in writing the IsValid( ) method included in the TEI class. Processing commences at 1550 whereupon a determination is made as to whether the tag has any attributes (decision 1560). If the tag does not have any attributes, decision 1560 branches to "no" branch 1590 and processing ends at 1595**.

On the other hand, if the tag has one or more attributes, decision 1560 branches to "yes" branch 1565 whereupon information pertaining to the first attribute is read (step 1570) and code is written to the IsValid( ) method to declare a local variable and initialize it to the attribute value (step 1580, see Appendix V, footnote 1, for an example). A determination is made as to whether the tag has more attributes (decision 1585). If the tag has more attributes, decision 1585 branches to "yes" loop 1588 which loops back to read the information pertaining to the next attribute and write the local variable information accordingly. This looping continues until there are no more attributes to process, at which time decision 1585 branches to "no" branch 1592 and processing ends at 1595.

Figure 16:
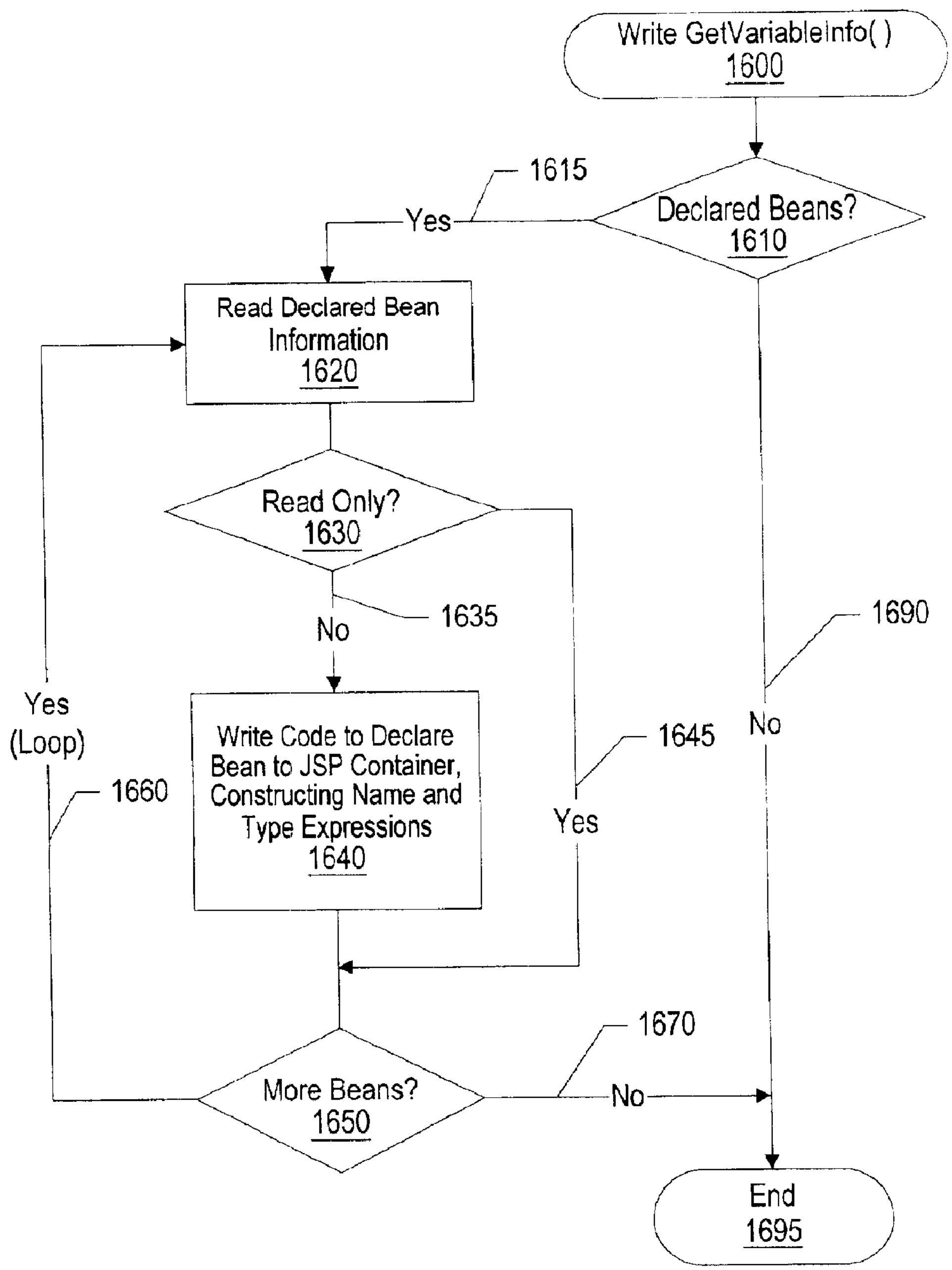
FIG. 16 is a flowchart showing the processing involved in writing the GetVariableInfo( ) method included in the TEI class.

FIG. 16 is a flowchart showing the processing involved in writing the GetVariableInfo( ) method included in the TEI class. Processing commences at 1600 whereupon a determination is made as to whether the tag includes any declared beans (decision 1610). Decision 1610 is based on information that was provided by the developer (see developer user interface screen in FIG. 8). If there are declared beans, decision 1610 branches to "yes" branch 1615 to process the beans. Information about the first bean is read (step 1620). A determination is made as to whether the bean is a read-only bean (decision 1630). If the bean is not a read only bean, decision 1630 branches to "no" branch 1635 whereupon code is written to declare the bean to the Java Server Page container, constructing the name and type expressions (step 1640, see Appendix U, footnote 1, for an example). On the other hand, if the bean is a read-only bean, decision 1630 branches to "yes" branch 1645 bypassing step 1640.

A determination is made as to whether there are more beans to process (decision 1650). If there are more beans, decision 1650 branches to "yes" branch 1660 whereupon processing loops back to read information regarding the next bean (step 1620) and process the bean accordingly. This looping continues until there are no more beans to process, at which time decision 1650 branches to "no" branch 1670 and processing ends at 1695.

Figure 17:
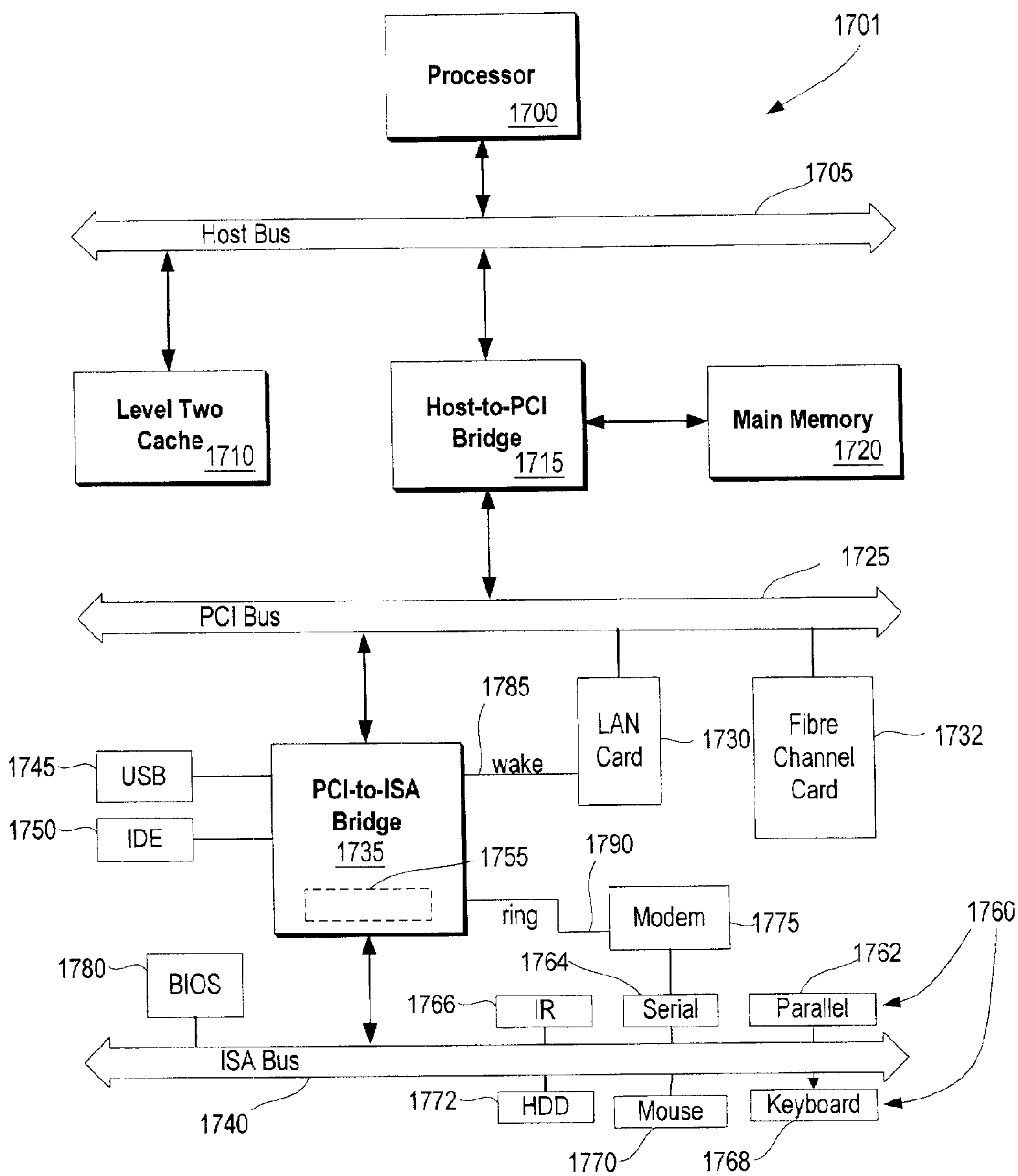
FIG. 17 is a block diagram of an information handling system capable of performing the present invention.

FIG. 17 illustrates information handling system 1701 which is a simplified example of a computer system capable of performing the copy processing described herein. Computer system 1701 includes processor 1700 which is coupled to host bus 1705. A level two (L2) cache memory 1710 is also coupled to the host bus 1705. Host-to-PCI bridge 1715 is coupled to main memory 1720, includes cache memory and main memory control functions, and provides bus control to handle transfers among PCI bus 1725, processor 1700, L2 cache 1710, main memory 1720, and host bus 1705. PCI bus 1725 provides an interface for a variety of devices including, for example, LAN card 1730. PCI-to-ISA bridge 1735 provides bus control to handle transfers between PCI bus 1725 and ISA bus 1740, universal serial bus (USB) functionality 1745, IDE device functionality 1750, power management functionality 1755, and can include other functional elements not shown, such as a real-time clock (RTC), DMA control, interrupt support, and system management bus support. Peripheral devices and input/output (I/O) devices can be attached to various interfaces 1760 (e.g., parallel interface 1762, serial interface 1764, infrared (IR) interface 1766, keyboard interface 1768, mouse interface 1770, and fixed disk (FDD) 1772) coupled to ISA bus 1740. Alternatively, many I/O devices can be accommodated by a super I/O controller (not shown) attached to ISA bus 1740.

BIOS 1780 is coupled to ISA bus 1740, and incorporates the necessary processor executable code for a variety of low-level system functions and system boot functions. BIOS 1780 can be stored in any computer readable medium, including magnetic storage media, optical storage media, flash memory, random access memory, read only memory, and communications media conveying signals encoding the instructions (e.g., signals from a network). In order to attach computer system 1701 another computer system to copy files over a network, LAN card 1730 is coupled to PCI-to-ISA bridge 1735. Similarly, to connect computer system 1701 to an ISP to connect to the Internet using a telephone line connection, modem 1775 is connected to serial port 1764 and PCI-to-ISA Bridge 1735.

While the computer system described in FIG. 17 is capable of executing the copying processes described herein, this computer system is simply one example of a computer system. Those skilled in the art will appreciate that many other computer system designs are capable of performing the copying process described herein.

One of the preferred implementations of the invention is a client application, namely, a set of instructions (program code) in a code module which may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

APPENDICES - SAMPLE OUTPUT FILES

The following appendices provide example output files that are generated in response to a developer's request. Custom tag files for three separate tag frameworks are included: (1) HelloTag; (2) LoopTag; and (3) ReverseTag. These tag frameworks can be created by selecting different options from the Define New Tag Screen (see Figure 8). The appendices included are as follows:

| Appendix | Description |
|---|---|
| A | Definition Section of HelloTag |
| B | doEndTag() Method of HelloTag |
| C | doStartTag() Method of HelloTag |
| D | Definition Section of HelloTEI (Tag Extra Info) |
| E | getVariableInfo() Method of HelloTEI |
| F | IsValid() Method of HelloTEI |
| G | Definition Section of LoopTag |
| H | doAfterBody() Method of LoopTag |
| I | doEndTag() Method of LoopTag |
| J | doInitBody() Method of LoopTag |
| K | doStartTag() Method of LoopTag |
| L | Definition Section of LoopTEI |
| M | getVariableInfo() Method of LoopTEI |
| N | isValid() Method of LoopTEI |
| O | Definition Section of ReverseTag |
| P | doAfterBody() Method of ReverseTag |
| Q | doEndTag() Method of ReverseTag |
| R | doInitBody() Method of ReverseTag |
| S | doStartTag() Method of ReverseTag |
| T | Definition Section of ReverseTEI |
| U | getVariableInfo() Method of ReverseTEI |
| V | isValid() Method of ReverseTEI |

APPENDIX A

Definition Section of HelloTag

```
package com.corp.codegen;

import java.io.IOException;
import javax.servlet.jsp.*;
import javax.servlet.jsp.tagext.*;
/**
 * Handles the hello tag.
 * Creation date: Wed Jun 20 15:33:28 EDT 2001
 * @author:
 */
public class HelloTag extends javax.servlet.jsp.tagext.TagSupport[1] {

//    The following fields map to the attributes for the hello tag.


//    The following fields map to the beans this tag handler shares
//    with other tag handlers through the pageContext.

/**
 * HelloTag constructor comment.
 */
public HelloTag() {
      super();
}
```

[1] See Figure 11 (process box 1110) for processing details.

36

APPENDIX B doEndTag() Method of HelloTag

```
/**
 * doEndTag() is invoked by the JSP container when the end tag
 * is encountered.
 *
 * Tag handlers can store objects into the pageContext using
 * pageContext.setAttribute(). Conversely, objects may be
 * retrieved from the page context using pageContext.getAttribute().
 * Objects can be removed from the pageContext using removeAttribute().
 *
 * The value returned by doEndTag() indicates to the JSP Container whether
 * or not the remainder of the page should be processed:
 *
 *     TagSupport:          no  = SKIP_PAGE
 *                          yes = EVAL_PAGE
 *
 *     BodyTagSupport:      no  = SKIP_PAGE
 *                          yes = EVAL_PAGE
 *
 */
public int doEndTag() throws JspException {

      int result = EVAL_PAGE;

      try { pageContext.getOut().println("<p>Default behavior in
HelloTag::doEndTag()</p>"); }
      catch (IOException e) { System.out.println("Error writing in
HelloTag::doEndTag()"); }


      release();
      return result;
}
}
```

APPENDIX C doStartTag() Method of HelloTag

```
/**
 * doStartTag() is invoked by the JSP container when the begin tag
 * is encountered.
 *
 * The value returned by doStartTag() indicates to the JSP Container whether
 * or not the contents of the tag should be processed:
 *
 *     TagSupport:        no  = SKIP_BODY
 *                        yes = EVAL_BODY_INCLUDE
 *
 *     BodyTagSupport:    no  = SKIP_BODY
 *                        yes = EVAL_BODY_TAG
 */
public int doStartTag() throws JspException {

      int result = EVAL_BODY_INCLUDE;[1]


      try { pageContext.getOut().println("<p>Default behavior in
HelloTag::doStartTag()</p>"); }
      catch (IOException e) { System.out.println("Error writing in
HelloTag::doStartTag()"); }


      return result;
}
```

[1] See Figure 12 (process box 1215) for processing details.

38

APPENDIX D

Definition Section of HelloTEI (Tag Extra Info)

```
package com.corp.codegen;

import javax.servlet.jsp.*;
import javax.servlet.jsp.tagext.*;
/**
 * Insert the type's description here.
 * Creation date: Wed Jun 20 15:33:28 EDT 2001
 * @author:
 */
public class HelloTEI extends javax.servlet.jsp.tagext.TagExtraInfo {
/**
 * HelloTEI constructor comment.
 */
public HelloTEI() {
      super();
}
```

39

APPENDIX E getVariableInfo() Method of HelloTEI

```
/*
 * The getVariableInfo() method is invoked by the JSP Container at
.* translate time  * for each instance of the tag.
.* The data parameter acts as a hashtable of attribute name/value associations.
 *
 * This method should return an array of VariableInfo instances, one instance
 * for each object to be created in or referenced from the pageContext by this
 * tag instance.
 *
 * A VariableInfo instance declares an object put into or retrieve from the
 * page context:
 *
 * name: a key string by which this object may be retrieved from the pageContext
 * type:    the fully qualified class name for the object
 * created: a boolean indicating that the object will be created by
.*          this tag instance
 * scope:   the scope of the object with respect to the
.*          tag:  AT_BEGIN, AT_END, NESTED
 *
 */
public VariableInfo[] getVariableInfo(TagData data) {
      VariableInfo vars[] = new VariableInfo[0];
      return vars;
}
}
```

APPENDIX F

IsValid() Method of HelloTEI

```
/*
 * The isValid() method is invoked by the JSP Container at translate time
 * for each instance of the tag.  The data parameter acts as a hashtable
 * of attribute name/value associations.
 *
 * This method should return a boolean indicating whether the combination
 * of specified attributes and values is valid. This method may not be needed
 * if it is sufficient to declare in the TLD that each attribute is to be
 * always required or always optional.
 *
 */
public boolean isValid(TagData data) {

//     The following variables are initialized to values specified on an
//     instance of the tag.
//     Possible values include:
//           VariableInfo.REQUEST_TIME_VALUE if an expression was specified,
//           A String if a constant value was specified, or
//           null if the attribute was not specified


//     Using the above information, if needed, return a boolean value
//     Indicating whether the set of specified attributes and values are valid.

       return true;
 }
```

APPENDIX G

Definition Section of LoopTag

```
package com.corp.codegen;

import java.io.IOException;
import javax.servlet.jsp.*;
import javax.servlet.jsp.tagext.*;
/**
 * Handles the loop tag.
 * Creation date: Wed Jun 20 15:33:28 EDT 2001
 * @author:
 */
public class LoopTag extends javax.servlet.jsp.tagext.BodyTagSupport[1] {

//    The following fields map to the attributes for the loop tag.

      private             int           count;[2]

//    The following fields map to the beans this tag handler shares
//    with other tag handlers through the pageContext.


/**
 * LoopTag constructor comment.
 */
public LoopTag() {
      super();
}
/**
 * Getter for property count.
 * @return int
 */
public int getCount() {
      return count;
}
/**
 * Setter for property count.
 * Once this property has been set by the JSP Container
 * you should avoid modifying the property value, either
 * directly or via this method.
 * @param newCount int
 */
public void setCount(int newCount) {
      count = newCount;
}
```

[1] See Figure 11 (process box 1115) for processing details.
[2] See Figure 11 (process box 1130) for processing details.

APPENDIX H doAfterBody() Method of LoopTag

```
/**
 * doAfterBody() is invoked by the JSP container for BodyTagSupport classes
 * after each time the contents of the tag have been processed.
 *
 * To get the results of processing the tag contents,
 * use getBodyContent().getString()
 *
 * Tag handlers can store objects into the pageContext using
 * pageContext.setAttribute().  Conversely, objects may be
 * retrieved from the page context using pageContext.getAttribute()
 *
 * The value returned by doAfterBody() indicates to the JSP Container whether
 * or not the tag's contents should be processed again.:
 *
 *     TagSupport:        not applicable
 *
 *     BodyTagSupport:    no  = SKIP_BODY
 *                        yes = EVAL_BODY_TAG
 *
 */
public int doAfterBody() throws JspException {
      try {
            BodyContent body = getBodyContent();
            body.writeOut(body.getEnclosingWriter());
            body.clearBody();[1]
      } catch (IOException ex) {
            throw new JspTagException("Error writing loop contents:
"+ex.getMessage());
      }

      try { getPreviousOut().println("<p>Default behavior in
LoopTag::doAfterBody()</p>"); }
      catch (IOException e) { System.out.println("Error writing in
LoopTag::doAfterBody()"); }

      int result = SKIP_BODY;

      return result;
}
```

[1] See Figure 13 (process box 1330) for processing details.

APPENDIX I doEndTag() Method of LoopTag

```
/**
 * doEndTag() is invoked by the JSP container when the end tag
 * is encountered.
 *
 * Tag handlers can store objects into the pageContext using
 * pageContext.setAttribute().  Conversely, objects may be
 * retrieved from the page context using pageContext.getAttribute().
 * Objects can be removed from the pageContext using removeAttribute().
 *
 * The value returned by doEndTag() indicates to the JSP Container whether
 * or not the remainder of the page should be processed:
 *
 *     TagSupport:         no  = SKIP_PAGE
 *                         yes = EVAL_PAGE
 *
 *     BodyTagSupport:     no  = SKIP_PAGE
 *                         yes = EVAL_PAGE
 *
 */
public int doEndTag() throws JspException {

      int result = EVAL_PAGE;

      try { pageContext.getOut().println("<p>Default behavior in
LoopTag::doEndTag()</p>"); }
      catch (IOException e) { System.out.println("Error writing in
LoopTag::doEndTag()"); }


      release();
      return result;
}
}
```

APPENDIX J doInitBody() Method of LoopTag

```
/**
 * doInitBody() is invoked by the JSP container just before the contents
 * of the tag are processed.  This method is invoked once per tag instance
 * even if the tag's contents are processed multiple times.
 *
 * Tag handlers can store objects into the pageContext using
 * pageContext.setAttribute().  Conversely, objects may be
 * retrieved from the page context using pageContext.getAttribute().
 * Objects can be removed from the pageContext using removeAttribute().
 *
 */
public void doInitBody() throws JspException {

      try { getPreviousOut().write("<p>Default behavior in
LoopTag::doInitBody()</p>"); }
      catch (IOException e) { System.out.println("Error writing in
LoopTag::doInitBody()"); }

}
```

APPENDIX K doStartTag() Method of LoopTag

```
/**
 * doStartTag() is invoked by the JSP container when the begin tag
 * is encountered.
 *
 * The value returned by doStartTag() indicates to the JSP Container whether
 * or not the contents of the tag should be processed:
 *
 *     TagSupport:        no  = SKIP_BODY
 *                        yes = EVAL_BODY_INCLUDE
 *
 *     BodyTagSupport:    no  = SKIP_BODY
 *                        yes = EVAL_BODY_TAG
 */
public int doStartTag() throws JspException {

      int result = EVAL_BODY_TAG;[1]


      try { pageContext.getOut().println("<p>Default behavior in
LoopTag::doStartTag()</p>"); }
      catch (IOException e) { System.out.println("Error writing in
LoopTag::doStartTag()"); }


      return result;
}
```

[1] See Figure 12 (process box 1210) for processing details.

APPENDIX L

Definition Section of LoopTEI

```
package com.corp.codegen;

import javax.servlet.jsp.*;
import javax.servlet.jsp.tagext.*;
/**
 * Insert the type's description here.
 * Creation date: Wed Jun 20 15:33:28 EDT 2001
 * @author:
 */
public class LoopTEI extends javax.servlet.jsp.tagext.TagExtraInfo {
/**
 * LoopTEI constructor comment.
 */
public LoopTEI() {
      super();
}
```

47

APPENDIX M getVariableInfo() Method of LoopTEI

```
/*
 * The getVariableInfo() method is invoked by the JSP Container at translate
time
 * for each instance of the tag.  The data parameter acts as a hashtable
 * of attribute name/value associations.
 *
 * This method should return an array of VariableInfo instances, one instance
 * for each object to be created in or referenced from the pageContext by this
 * tag instance.
 *
 * A VariableInfo instance declares an object put into or retrieve from the
 * page context:
 *
 *   name:    a key string by which this object may be retrieved from the
pageContext
 *   type:    the fully qualified class name for the object
 *   created: a boolean indicating that the object will be created by this tag
instance
 *   scope:   the scope of the object with respect to the tag:  AT_BEGIN,
AT_END, NESTED
 *
 */
public VariableInfo[] getVariableInfo(TagData data) {
      VariableInfo vars[] = new VariableInfo[0];
      return vars;
}
}
```

APPENDIX N isValid() Method of LoopTEI

```
/*
 * The isValid() method is invoked by the JSP Container at translate time
 * for each instance of the tag.  The data parameter acts as a hashtable
 * of attribute name/value associations.
 *
 * This method should return a boolean indicating whether the combination
 * of specified attributes and values is valid. This method may not be needed
 * if it is sufficient to declare in the TLD that each attribute is to be
 * always required or always optional.
 *
 */
public boolean isValid(TagData data) {

//     The following variables are initialized to values specified on an instance
of the tag.
//     Possible values include:
//           VariableInfo.REQUEST_TIME_VALUE if an expression was specified,
//           A String if a constant value was specified, or
//           null if the attribute was not specified

       String      count = data.getAttributeString("count");

//     Using the above information, if needed, return a boolean value
//     Indicating whether the set of specified attributes and values are valid.

       return true;
}
```

APPENDIX O

Definition Section of ReverseTag

```
package com.corp.codegen;

import java.io.IOException;
import javax.servlet.jsp.*;
import javax.servlet.jsp.tagext.*;
/**
 * Handles the reverse tag.
 * Creation date: Wed Jun 20 15:33:28 EDT 2001
 * @author:
 */
public class ReverseTag extends javax.servlet.jsp.tagext.BodyTagSupport {

//    The following fields map to the attributes for the reverse tag.

      private           boolean             byWord;
      private           boolean             trim;
      private           java.lang.String          var;
      private           java.lang.String          type;

//    The following fields map to the beans this tag handler shares
//    with other tag handlers through the pageContext.

      private           java.lang.Object           contextBean0 = null;[1]
      private           java.lang.String           _contextBean1 = null;
      private           java.lang.String           _contextBean2 = null;
      private           java.lang.Object           _contextBean3 = null;
/**
 * ReverseTag constructor comment.
 */
public ReverseTag() {
      super();
}
/**
 * Getter for property byWord.
 * @return boolean
 */
public boolean isByWord() {
      return byWord;
}
/**
 * Setter for property byWord.
 * Once this property has been set by the JSP Container
 * you should avoid modifying the property value, either
 * directly or via this method.
 * @param newByWord boolean
 */
public void setByWord(boolean newByWord) {
      byWord = newByWord;
}
```

[1] See Figure 11 (process box 1160) for processing details.

```
/**
 * Getter for property trim.
 * @return boolean
 */
public boolean isTrim() {
      return trim;
}
/**
 * Setter for property trim.
 * Once this property has been set by the JSP Container
 * you should avoid modifying the property value, either
 * directly or via this method.
 * @param newTrim boolean
 */
public void setTrim(boolean newTrim) {
      trim = newTrim;
}
/**
 * Getter for property var.
 * @return java.lang.String
 */
public java.lang.String getVar() {
      return var;
}
/**
 * Setter for property var.
 * Once this property has been set by the JSP Container
 * you should avoid modifying the property value, either
 * directly or via this method.
 * @param newVar java.lang.String
 */
public void setVar(java.lang.String newVar) {
      var = newVar;
}
/**
 * Getter for property type.
 * @return java.lang.String
 */
public java.lang.String getType() {
      return type;
}
/**
 * Setter for property type.
 * Once this property has been set by the JSP Container
 * you should avoid modifying the property value, either
 * directly or via this method.
 * @param newType java.lang.String
 */
public void setType(java.lang.String newType) {
      type = newType;
}
```

APPENDIX P doAfterBody() Method of ReverseTag

```
/**
 * doAfterBody() is invoked by the JSP container for BodyTagSupport classes
 * after each time the contents of the tag have been processed.
 *
 * To get the results of processing the tag contents,
 * use getBodyContent().getString()
 *
 * Tag handlers can store objects into the pageContext using
 * pageContext.setAttribute().  Conversely, objects may be
 * retrieved from the page context using pageContext.getAttribute()
 *
 * The value returned by doAfterBody() indicates to the JSP Container whether
 * or not the tag's contents should be processed again.:
 *
 *     TagSupport:       not applicable
 *
 *     BodyTagSupport:   no  = SKIP_BODY
 *                       yes = EVAL_BODY_TAG
 *
 */
public int doAfterBody() throws JspException {
      try {
            BodyContent body = getBodyContent();
            String content = body.getString();
                  //    This is where you put the logic
                  //    that processes the tag's content
            String processedContent = content;
            getPreviousOut().write(processedContent);
            body.clearBody();[1]
      } catch (IOException ex) {
            throw new JspTagException("Error writing reverse contents:
"+ex.getMessage());
      }

      try { getPreviousOut().println("<p>Default behavior in
ReverseTag::doAfterBody()</p>"); }
      catch (IOException e) { System.out.println("Error writing in
ReverseTag::doAfterBody()"); }

      int result = SKIP_BODY;

      return result;
}
```

[1] See Figure 13 (process box 1320) for processing details.

APPENDIX Q doEndTag() Method of ReverseTag

```
/**
 * doEndTag() is invoked by the JSP container when the end tag
 * is encountered.
 *
 * Tag handlers can store objects into the pageContext using
 * pageContext.setAttribute(). Conversely, objects may be
 * retrieved from the page context using pageContext.getAttribute().
 * Objects can be removed from the pageContext using removeAttribute().
 *
 * The value returned by doEndTag() indicates to the JSP Container whether
 * or not the remainder of the page should be processed:
 *
 *      TagSupport:         no  = SKIP_PAGE
 *                          yes = EVAL_PAGE
 *
 *      BodyTagSupport:     no  = SKIP_PAGE
 *                          yes = EVAL_PAGE
 *
 */
public int doEndTag() throws JspException {

      int result = EVAL_PAGE;

      try { pageContext.getOut().println("<p>Default behavior in
ReverseTag::doEndTag()</p>"); }
      catch (IOException e) { System.out.println("Error writing in
ReverseTag::doEndTag()"); }

      pageContext.setAttribute("hc", contextBean1);[1]
      pageContext.removeAttribute("iter");[2]

      release();
      return result;
}
}
```

[1] See Figure 14 (process box 1460) for processing details.
[2] See Figure 14 (process box 1440) for processing details.

APPENDIX R doInitBody() Method of ReverseTag

```
/**
 * doInitBody() is invoked by the JSP container just before the contents
 * of the tag are processed.  This method is invoked once per tag instance
 * even if the tag's contents are processed multiple times.
 *
 * Tag handlers can store objects into the pageContext using
 * pageContext.setAttribute().  Conversely, objects may be
 * retrieved from the page context using pageContext.getAttribute().
 * Objects can be removed from the pageContext using removeAttribute().
 *
 */
public void doInitBody() throws JspException {

      try { getPreviousOut().write("<p>Default behavior in
ReverseTag::doInitBody()</p>"); }
      catch (IOException e) { System.out.println("Error writing in
ReverseTag::doInitBody()"); }

}
```

APPENDIX S doStartTag() Method of ReverseTag

```
/**
 * doStartTag() is invoked by the JSP container when the begin tag
 * is encountered.
 *
 * The value returned by doStartTag() indicates to the JSP Container whether
 * or not the contents of the tag should be processed:
 *
 *     TagSupport:        no  = SKIP_BODY
 *                        yes = EVAL_BODY_INCLUDE
 *
 *     BodyTagSupport:    no  = SKIP_BODY
 *                        yes = EVAL_BODY_TAG
 */
public int doStartTag() throws JspException {

      int result = EVAL_BODY_TAG;

      _contextBean3 = (java.lang.Object) pageContext.getAttribute("appContext");[1]

      try { pageContext.getOut().println("<p>Default behavior in
ReverseTag::doStartTag()</p>"); }
      catch (IOException e) { System.out.println("Error writing in
ReverseTag::doStartTag()"); }

      pageContext.setAttribute(var, _contextBean0);[2]
      pageContext.setAttribute("iter",_contextBean2);

      return result;
}
```

---

[1] See Figure 12 (process box 1235) for processing details.

[2] See Figure 12 (process box 1270) for processing details.12

APPENDIX T

Definition Section of ReverseTEI

```
package com.corp.codegen;

import javax.servlet.jsp.*;
import javax.servlet.jsp.tagext.*;
/**
 * Insert the type's description here.
 * Creation date: Wed Jun 20 15:33:28 EDT 2001
 * @author:
 */
public class ReverseTEI extends javax.servlet.jsp.tagext.TagExtraInfo {
/**
 * ReverseTEI constructor comment.
 */
public ReverseTEI() {
	super();
}
```

56

APPENDIX U getVariableInfo() Method of ReverseTEI

```
/*
 * The getVariableInfo() method is invoked by the JSP Container at translate
time
 * for each instance of the tag.  The data parameter acts as a hashtable
 * of attribute name/value associations.
 *
 * This method should return an array of VariableInfo instances, one instance
 * for each object to be created in or referenced from the pageContext by this
 * tag instance.
 *
 * A VariableInfo instance declares an object put into or retrieve from the
 * page context:
 *
 *   name:    a key string by which this object may be retrieved from the
pageContext
 *   type:    the fully qualified class name for the object
 *   created: a boolean indicating that the object will be created by this tag
instance
 *   scope:   the scope of the object with respect to the tag:  AT_BEGIN,
AT_END, NESTED
 *
 */
public VariableInfo[] getVariableInfo(TagData data) {
VariableInfo vars[] = new VariableInfo[3];
vars[0] = new
VariableInfo(data.getAttributeString("var"),data.getAttributeString("type"),true
,VariableInfo.AT_BEGIN);
vars[1] = new VariableInfo("hc","java.lang.String",true,VariableInfo.AT_END);
vars[2] = new VariableInfo("iter","java.lang.String",true,VariableInfo.NESTED);[1]
return vars;
}
}
```

[1] See Figure 16 (process box 1640) for processing details.

APPENDIX V isValid() Method of ReverseTEI

```
/*
 * The isValid() method is invoked by the JSP Container at translate time
 * for each instance of the tag.  The data parameter acts as a hashtable
 * of attribute name/value associations.
 *
 * This method should return a boolean indicating whether the combination
 * of specified attributes and values is valid. This method may not be needed
 * if it is sufficient to declare in the TLD that each attribute is to be
 * always required or always optional.
 *
 */
public boolean isValid(TagData data) {

//    The following variables are initialized to values specified on an instance
of the tag.
//    Possible values include:
//          VariableInfo.REQUEST_TIME_VALUE if an expression was specified,
//          A String if a constant value was specified, or
//          null if the attribute was not specified

      String      byWord = data.getAttributeString("byWord");[1]
      Object      trim = data.getAttribute("trim");
      Object      var = data.getAttribute("var");
      String      type = data.getAttributeString("type");

//    Using the above information, if needed, return a boolean value
//    Indicating whether the set of specified attributes and values are valid.

      return true;
}
```

Figure 15B:
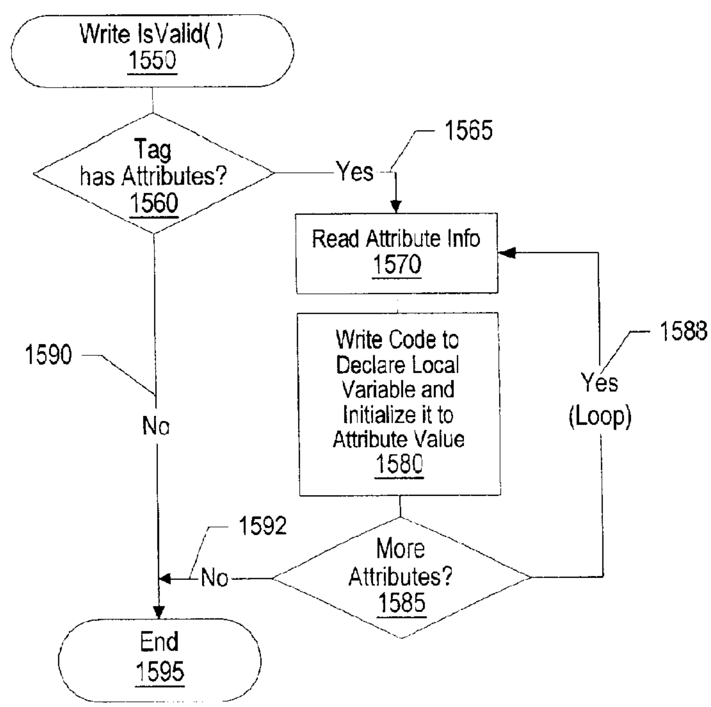
FIG. 15*b* is a flowchart showing the processing involved in writing the IsValid( ) method included in the TEI class.

[1] See Figure 15b (process box 1580) for processing details.

What is claimed is:

1. A method for dynamically packaging objects, said method comprising:

receiving a request from a client computer system through a computer network, the request corresponding to a plurality of objects;

generating a tag library definition file corresponding to one or more tag specifications received in the request;

generating a tag handler class file for one or more custom tags;

generating a tag extra info file for each of the custom tags;

preparing the plurality of objects, the preparing including writing each of the objects to a package file, wherein the writing includes writing the tag library definition file, the tag handler class files, and the tag extra info files to the package file; and downloading the package file to the client computer system.

2. The method as described in claim 1 further comprising:

sending a package download dialog to the client computer system in response to the preparing; and receiving a download request from the client computer system in response to the package download dialog, wherein the downloading is performed in response to the download request.

3. The method as described in claim 1 further comprising:

dynamically creating at least one of the objects based on the request.

4. The method as described in claim 3 wherein the dynamically creating further includes:

identifying one or more standard component objects corresponding to the request; and modifying the identified standard component objects based on one or more specifications included in the request.

5. The method as described in claim 1 wherein one of the objects includes a Java definition file and wherein the package file is a Java jar file.

6. The method as described in claim 1 further comprising:

generating source code in response to the request; and writing the generated source code to one of the objects.

7. An information handling system comprising:

one or more processors;

a memory accessible by the processors;

a network interface for connecting the information handling system to a computer network;

one or more nonvolatile storage devices accessible by the processors; and a dynamic packaging tool to package a plurality of objects, the dynamic packaging tool including:

means for receiving a request from a client computer system through a computer network, the request corresponding a plurality of objects;

means for generating a tag library definition file corresponding to one or more tag specifications received in the request;

means for generating a tag handler class file for one or more custom tags;

means for generating a tag extra info file for each of the custom tags;

means for preparing the plurality of objects, the preparing including writing each of the objects to a package file, wherein the means for writing includes means for writing the tag library definition file, the tag handler class files, and the tag extra info files to the package file; and means for downloading the package file to the client computer system.

8. The information handling system as described in claim 7 further comprising:

means for sending a package download dialog to the client computer system in response to the means for preparing; and means for receiving a download request from the client computer system in response to the package download dialog, wherein the means for downloading is performed in response to the download request.

9. The information handling system as described in claim 7 further comprising:

means for dynamically creating at least one of the objects based on the request.

10. The information handling system as described in claim 9 wherein the means for dynamically creating further includes:

means for identifying one or more standard component objects corresponding to the request; and means for modifying the identified standard component objects based on one or more specifications included in the request.

11. The information handling system as described in claim 7 further comprising:

means for generating source code in response to the request; and means for writing the generated source code to one of the objects.

12. A computer program product stored in a computer operable media for dynamically packaging objects, said computer program product comprising:

means for receiving a request from a client computer system through a computer network, the request corresponding a plurality of objects;

means for generating a tag library definition file corresponding to one or more tag specifications received in the request;

means for generating a tag handler class file for one or more custom tags;

means for generating a tag extra info file for each of the custom tags;

means for preparing the plurality of objects, the preparing including writing each of the objects to a package file, wherein the means for writing includes means for writing the tag library definition file, the tag handler class files, and the tag extra info files to the package file; and means for downloading the package file to the client computer system.

13. The computer program product as described in claim 12 further comprising:

means for sending a package download dialog to the client computer system in response to the means for preparing; and means for receiving a download request from the client computer system in response to the package download dialog, wherein the means for downloading is performed in response to the download request.

14. The computer program product as described in claim 12 further comprising:

means for dynamically creating at least one of the objects based on the request.

15. The computer program product as described in claim 14 wherein the means for dynamically creating further includes:

means for identifying one or more standard component objects corresponding to the request; and means for modifying the identified standard component objects based on one or more specifications included in the request.

16. The computer program product as described in claim 12 wherein one of the objects includes a Java definition file and wherein the package file is a Java jar file.

17. The computer program product as described in claim 12 further comprising:

means for generating source code in response to the request; and means for writing the generated source code to one of the objects.

* * * * *